United States Patent
Vladimirskiy

(10) Patent No.: US 11,748,125 B2
(45) Date of Patent: Sep. 5, 2023

(54) SYSTEMS AND METHODS OF AUTO-SCALING A VIRTUAL DESKTOP ENVIRONMENT

(71) Applicant: Nerdio, Inc., Chicago, IL (US)

(72) Inventor: Vadim Vladimirskiy, Chicago, IL (US)

(73) Assignee: Nerdio, Inc., Skokie, IL (US)

(*) Notice: Subject to any disclaimer, the term of this patent is extended or adjusted under 35 U.S.C. 154(b) by 0 days.

(21) Appl. No.: 17/902,520

(22) Filed: Sep. 2, 2022

(65) Prior Publication Data
US 2023/0004410 A1    Jan. 5, 2023

Related U.S. Application Data

(63) Continuation of application No. 17/696,311, filed on Mar. 16, 2022.

(60) Provisional application No. 63/161,700, filed on Mar. 16, 2021.

(51) Int. Cl.
   *G06F 9/451* (2018.01)
   *G06F 9/50* (2006.01)

(52) U.S. Cl.
   CPC ............ *G06F 9/452* (2018.02); *G06F 9/5077* (2013.01); *G06F 2209/5011* (2013.01)

(58) Field of Classification Search
   None
   See application file for complete search history.

(56) References Cited

U.S. PATENT DOCUMENTS

| | | | |
|---|---|---|---|
| 8,689,038 B2 * | 4/2014 | Alibakhsh | H04L 67/1001 |
| | | | 714/4.11 |
| 9,645,847 B1 * | 5/2017 | Roth | G06F 9/461 |
| 9,775,008 B2 * | 9/2017 | Patel | H04L 67/1001 |
| 9,971,621 B1 * | 5/2018 | Berg | G06F 9/5077 |
| 9,971,664 B2 * | 5/2018 | Raghunathan | G06F 9/45558 |
| 10,210,010 B1 * | 2/2019 | Ramachandran | G06F 11/1451 |
| 10,379,898 B2 * | 8/2019 | Malik | G06F 9/4856 |
| 10,715,403 B2 * | 7/2020 | Vladimirskiy | G06F 9/5083 |
| 11,113,120 B1 * | 9/2021 | Greenfield | G06F 9/4881 |
| 11,252,050 B2 * | 2/2022 | Vladimirskiy | H04L 41/5054 |
| 11,347,549 B2 * | 5/2022 | Tang | G06F 9/5061 |
| 11,405,369 B1 * | 8/2022 | Retyunskiy | H04L 9/3263 |
| 2012/0254443 A1 * | 10/2012 | Ueda | H04L 67/1008 |
| | | | 709/226 |
| 2014/0058871 A1 * | 2/2014 | Marr | G06F 9/45533 |
| | | | 718/1 |

(Continued)

Primary Examiner — Hiren P Patel
(74) Attorney, Agent, or Firm — K&L Gates LLP

(57) ABSTRACT

A system for dynamically auto-scaling allocated capacity of a virtual desktop environment includes: base capacity resources and burst capacity resources and memory coupled to a controller; wherein, in response to executing program instructions, the controller is configured to: in response to receiving a log in request from a first user device, connect the first user device to a first host pool to which the first device user is assigned; execute a load-balancing module to determine a first session host virtual machine to which to connect the first user device; and execute an auto-scaling module comprising a user-selectable auto-scaling trigger and a user-selectable conditional auto-scaling action, wherein, in response to recognition of the conditional auto-scaling action, the controller powers on or powers off one or more base capacity resources or creates or destroys one or more burst capacity resources.

12 Claims, 16 Drawing Sheets

(56) References Cited

U.S. PATENT DOCUMENTS

| | | | | |
|---|---|---|---|---|
| 2015/0172205 A1* | 6/2015 | Anderson | ............ | G06F 9/5077 709/224 |
| 2015/0278061 A1* | 10/2015 | Siciliano | ............ | G06F 11/3034 702/186 |
| 2015/0378765 A1* | 12/2015 | Singh | ................. | G06F 9/45558 718/1 |
| 2016/0170792 A1* | 6/2016 | Kato | ..................... | G06F 9/5077 718/1 |
| 2016/0344821 A1* | 11/2016 | Khosrowpour | ..... | H04L 67/1029 |
| 2017/0034198 A1* | 2/2017 | Powers | ............... | H04L 63/1441 |
| 2017/0339196 A1* | 11/2017 | Lewis | .................. | H04L 63/083 |
| 2018/0157561 A1* | 6/2018 | Venkatesh | ............ | G06F 3/0665 |
| 2018/0199239 A1* | 7/2018 | Sabater Maroto | .. | H04L 41/0893 |
| 2018/0210759 A1* | 7/2018 | Morita | .................. | G06F 9/5044 |
| 2019/0052528 A1* | 2/2019 | Yoshimura | .......... | H04L 41/0813 |
| 2020/0004590 A1* | 1/2020 | Tang | .................... | G06F 9/5005 |
| 2022/0156124 A1* | 5/2022 | Nandavanam | ........ | G06F 9/5027 |
| 2022/0173983 A1* | 6/2022 | Vladimirskiy | ........ | G06F 9/5083 |
| 2022/0283875 A1* | 9/2022 | Ukawa | .................. | G06F 16/183 |
| 2022/0300305 A1* | 9/2022 | Vladimirskiy | ........ | G06F 9/5022 |

\* cited by examiner

FIG. 8

② SCALING LOGIC ⓘ — 158

SELECT AUTOSCALE TRIGGER:

[CPU USAGE ▼] ⓘ — 160

START OR CREATE (SCALE OUT) UP TO [1] HOST(S) IF CPU UTILIZATION ACROSS ALL HOSTS EXCEEDS [65] % FOR [5 ▼] MINUTES ⓘ

STOP OR REMOVE (SCALE IN) UP TO [1] HOST(S) IF CPU UTILIZATION ACROSS ALL HOSTS DROPS BELOW [40] % FOR [15 ▼] MINUTES ⓘ

162, 164

AUTO-SCALE

RemoteApp host pools deliver applications that are published to assigned users. These RemoteApps are provided by a pool of session host VMs. Multiple users may stream RemoteApps from the same session host VM. Auto-scaling is configured by s the host pool with sufficient capacity to support the user load. When auto-scale is turned off, session hosts can be manually added to and removed from the host pool.

Hosts will be provisioned based on the template for pool: — 200

| | |
|---|---|
| NAME PREFIX: | FIELDAPPS |
| NETWORK: | NWM-Demo-Vnet (NWM) ▼ |
| DESKTOP IMAGE (TEMPLATE): | FieldTechs01 (Feb 9, 2020 01:26 PM) ▼ |
| VM SIZE (TEMPLATE): | D4s_v3 (4C/16GB/Standard) ▼ |
| OS DISK (TEMPLATE): | 128 GB (P10/Premium SSD) ▼ |
| RESOURCE GROUP: | NWM-Demo ▼ |
| Re-use host names | |

⎫ 204

ESTIMATED MONTHLY COSTS
| | MINIMUM ⊙ | MAXIMUM ⊙ |
|---|---|---|
| COMPUTE ⊙ | $139.05 | $730.00 |
| STORAGE ⊙ | $48.81 | $98.55 |

— 202

Changes to the template will apply to newly created or re-imaged host VMs.

① HOST POOL SIZING ⊙ — 206

Active host defined as: WVD agent Available ▼ ⊙
Base host pool capacity: [2] host(s) in the pool
Min active host capacity: [0] host(s) in the pool
Burst beyond base capacity: up to [3] extra host(s) in the pool

② SCALING LOGIC ⊙ — 208

Select autoscale trigger: CPU usage ▼ ⊙

START OR CREATE (SCALE OUT) UP TO [1] HOST(S) IF CPU UTILIZATION ACROSS ALL HOSTS EXCEEDS [65] % FOR [5 ▼] MINUTES ⊙
START OR CREATE (SCALE IN) UP TO [1] HOST(S) IF CPU UTILIZATION ACROSS ALL HOSTS DROPS BELOW [40] % FOR [15 ▼] MINUTES ⊙

Scale in restrictions
Stop or remove (scale in) hosts only from: [5 p.m. ▼] [12 a.m. ▼] (UTC-06:00) Central Time (US & Canada) ▼ ⊙
Scale in agressiveness: [High ▼] ⊙

③ PRE-STAGE HOSTS — 210

Work days: [Monday - Friday ▼] (UTC-06:00) Central Time (US & Canada) ▼
Start of work hours: [9 a.m. ▼] ⊙
Hosts to be active by start of work hours: [4]

| Field Apps | RemoteApp | User sessions: 0 | Min: 0, Capacity: 2, Burst: 3 | FieldTechs01 | Monthly savings: $419.20 (67.1%) ⊕ |
|---|---|---|---|---|---|
| <no description> | Breadth first load balancing | Assigned users: 83 | Scale out trigger: CPU (65%) for 5 mins | D4s_v3 (4C/16GB/Standard) | Named user cost: $2.48/month ⊕ |
| (nwm-demo) | Max session limit: Unlimited (999,999) | Assigned groups: 0 | Scale in trigger: CPU (40%) for 15 mins | 128 GB (P10/Premium SSD) | Concurrent user cost: $102.78/month ⊕ |
| | | Hosts: 0 ON/2 (CPUs: 8) | Pre-stage 4 hosts @ 9am | Feb 9, 2020 01:26 PM | |

| WORKSPACES | | | | | Search |
|---|---|---|---|---|---|
| NAME | USER FRIENDLY NAME ⊕ | USAGE (PAST 30 DAYS) ⊕ | ADDITIONAL INFO ⊕ | MONTHLY SAVINGS & COSTS ⊕ |
| Spring Update Workspace ARM object model (NWM-Demo / northcentralus) | Spring Update Workspace | Highest named users: 86 Monthly active users: 3 Highest concurrent users: 3 Highest CPU cores: 56 | Session desktop pools: 5 (6 hosts) Personal desktop pools: 3 (5 hosts) RemoteApp pools: 1 (2 hosts) | Monthly savings: $1,328.68 (82.13%) ⊕ Named user cost: $0.84/month ⊕ Concurrent user cost: $58.33/month ⊕ |

FIG. 17

| NAME ⊙ | FRIENDLY NAME ⊙ | DESKTOP EXPERIENCE ⊙ | STATUS ⊙ | AUTO-SCALE ⊙ | IMAGE ⊙ | MONTHLY SAVINGS & COSTS ⊙ |
|---|---|---|---|---|---|---|
| Ephemeral OS Disk <no description> (NWM-Demo) | EOSD | Session desktop (pooled) Breadth first load balancing Max session limit: Unlimited (999,999) | User sessions: 0 Assigned users: 83 Assigned groups: 75 Hosts: 0 ON/0 (CPUs:0) | Min: 0, Capacity: 0, Burst: 2 Scale out trigger: CPU (65%) for 5 mins Scale in trigger: CPU (40%) for 15 mins Pre-stage 1 hosts @ 8am | Window D8s_v3 128 GB | Date range used for estimation: July 3, 2020, 11 PM - August 2, 2020, 10 PM (Duration: 29d 23h) Projected peak cost: $624.76/month | Projected actual cost: $205.56/month | Projected auto-scale savings: $419.20/month Named users: 83 | Concurrent users: 2 Monthly savings: $419.20 (67.1%) Named user cost: $2.48/month Concurrent user cost: $102.78/month |
| Field Apps <no description> (NWM-Demo) | Field Apps | RemoteApp Breadth first load balancing Max session limit: Unlimited (999,999) | User sessions: 0 Assigned users: 83 Assigned groups: 0 Hosts: 0 ON/2 (CPUs:8) | Min: 0, Capacity: 2, Burst: 3 Scale out trigger: CPU (65%) for 5 mins Scale in trigger: CPU (40%) for 15 mins Pre-stage 4 hosts @ 9am | FieldTechs01 D4s_v3 (4C/16GB/Standard) 128 GB (P10/Premium SSD) Feb 9, 2020 01:26 PM | |

[Manage Hosts ▼]  — 218

FIG. 18

| NAME ⊙ | USER FRIENDLY NAME ⊙ | USAGE (PAST 30 DAYS) ⊙ | ADDITIONAL INFO ⊙ | |
|---|---|---|---|---|
| Spring Update Workspace ARM object model (NWM-Demo/northcentralus) | Spring Update Workspace | Highest named users: 86 Monthly active users: 3 Highest concurrent users: 3 Highest CPU cores: 56 | Session desktop pools: 5 (6 hosts) Personal desktop pools: 3 (5 hosts) RemoteApp pools: 1 (2 hosts) | Projected peak cost: $1,678.63/month | Projected actual cost: $349.45/month | Projected auto-scale savings: $1,328.68 (82.13%) Monthly savings: $1,328.68 (82.13%) Named user cost: $0.84/month Concurrent user cost: $58.33/month |

[User sessions ▼] — 220

| NAME ⊙ | FRIENDLY NAME ⊙ | DESKTOP EXPERIENCE ⊙ | STATUS ⊙ | AUTO-SCALE ⊙ | IMAGE ⊙ | MONTHLY SAVINGS & COSTS ⊙ |
|---|---|---|---|---|---|---|
| Ephemeral OS Disk <no description> (NWM-Demo) | EOSD | Session desktop (pooled) Breadth first load balancing Max session limit: Unlimited (999,999) | User sessions: 0 Assigned users: 83 Assigned groups: 75 Hosts: 0 ON/0 (CPUs:0) | Min: 0, Capacity: 0, Burst: 2 Scale out trigger: CPU (65%) for 5 mins Scale in trigger: CPU (40%) for 15 mins Pre-stage 1 hosts @ 8am | Window D8s_v3 128 GB | Date range used for estimation: July 3, 2020, 11 PM - August 2, 2020, 10 PM (Duration: 29d 23h) Projected peak cost: $624.76/month | Projected actual cost: $205.56/month | Projected auto-scale savings: $419.20/month Named users: 83 | Concurrent users: 2 Monthly savings: $419.20 (67.1%) | Named user cost: $2.48/month ⊙ Concurrent user cost: $102.78/month ⊙ |
| Field Apps <no description> (NWM-Demo) | Field Apps | RemoteApp Breadth first load balancing Max session limit: Unlimited (999,999) | User sessions: 0 Assigned users: 83 Assigned groups: 0 Hosts: 0 ON/2 (CPUs:8) | Min: 0, Capacity: 2, Burst: 3 Scale out trigger: CPU (65%) for 5 mins Scale in trigger: CPU (40%) for 15 mins Pre-stage 4 hosts @ 9am | FieldTechs01 D4s_v3 (4C/16GB/Standard) 128 GB (P10/Premium SSD) Feb 9, 2020 01:26 PM | |

Manage Hosts ▼

| NAME ⊙ | USER FRIENDLY NAME ⊙ | ADDITIONAL INFO ⊙ | USAGE (PAST 30 DAYS) ⊙ | |
|---|---|---|---|---|
| Spring Update Workspace ARM object model (NWM-Demo/northcentralus) | Spring Update Workspace | Session desktop pools: 5 (6 hosts) Personal desktop pools: 3 (5 hosts) RemoteApp pools: 1 (2 hosts) | Highest named users: 86 Monthly active users: 3 Highest concurrent users: 3 Highest CPU cores: 56 | Projected peak cost: $1,678.63/month | Projected actual cost: $349.45/month | Projected auto-scale savings: $1,328.68 (82.13%) Monthly savings: $1,328.68 (82.13%) ⊙ Named user cost: $0.84/month ⊙ Concurrent user cost: $58.33/month ⊙ |

User sessions ▼

SYSTEMS AND METHODS OF AUTO-SCALING A VIRTUAL DESKTOP ENVIRONMENT

CROSS-REFERENCE TO PRIOR APPLICATIONS

The present application comprises a continuation of U.S. application Ser. No. 17/696,311 filed Mar. 16, 2022, which claims the benefit of priority to U.S. Provisional Application No. 63/161,700 filed Mar. 16, 2021, the entireties of which are incorporated herein by reference.

BACKGROUND OF THE INVENTION

The present subject matter relates generally to the real-time auto-scaling of a virtual desktop environment. More specifically, the present invention relates to systems and methods for automatically scaling up and down allocated capacity of a virtual desktop environment and for providing dynamic cost estimation tools and visualization tools for the scalable environment.

End-user experience is extremely important for virtual desktop technology adoption. End-user experience depends primarily on performance. Performance depends on working in a properly-sized computing environment that is providing the right amount of compute resources at the right time. If the environment is undersized, the resulting poor computing performance leads to a poor user experience. On the other side of the analysis, if the environment is oversized, user experience will be excellent, but the costs of operating the environment will be higher than necessary.

In public cloud environments, the cost of the virtual desktop environment is determined by the allocated capacity. Allocated capacity is the amount of the allocated resources and the period of time for which the resources are allocated. For example, the allocated capacity may be defined by the number of CPU cores, GB of RAM, and GB of storage, etc. are allocated to a customer for a specified period of time. In public cloud environments, the cost of allocated capacity is independent from the utilization of the allocated capacity. In other words, the cost of allocated capacity is not affected by the utilization or lack of utilization of the allocated capacity. Generally speaking, if one allocates a large amount of capacity for a specified time, the full cost of that allocation will be incurred, even if the allocated capacity is never used.

Accordingly, in a public cloud environment, there is a constant challenge of balancing an appropriately-sized amount of capacity with the actual demand for that capacity. This is especially important in virtual desktop scenarios where insufficient capacity leads to poor end-user experience and excess capacity leads to high costs. Complicating the challenge is that demand is typically not constant over time. For example, a typical business environment presents very different virtual desktop demands during normal business operating hours as compared to times outside of those business operating hours. Thus, what may be appropriate capacity at a given time during a given day of the week, may be considered unnecessary over-capacity on a different day and/or time.

In typical public cloud environments, IT administrators are forced to estimate the "peak demand" on a particular system (i.e., how much capacity will be needed at peak utilization times) and then allocate the resources necessary to support the peak capacity at all times not being able to perfectly predict when these peaks will occur. As a result, the system administrator is paying for excess capacity at all times when the actual system demand is below peak demand. In normal business environments, it is rare that the actual system demands require all of the allocated resources more than an occasional minority of the time. As a result, the majority of the time, the system administrator is paying for excess (i.e., under-utilized) capacity.

Accordingly, there is a need for dynamically auto-scaling allocated capacity of a virtual desktop environment.

As noted above, the typical public cloud environment does not provide any meaningfully dynamic scaling tools for increasing or decreasing allocated capacity. Additionally, there are specific challenges that may arise when dealing with scaling down allocated capacity of a system that is in use.

Virtual desktop sessions are tied to a specific virtual machine (VM). It is currently not possible to dynamically "move" a virtual desktop session from one VM to another without logging the user out of their current session, which requires saving all data and closing all applications. Therefore, it is important to consider all of the implications when scaling in (i.e., scaling down) capacity to make it as non-disruptive as possible to the end-users while at the same time optimizing cost savings.

In the process of normal operation, session host VMs can become "broken," meaning they can go into a state where they cannot properly serve user desktop sessions. When this happens in existing virtual desktop environments, the host pool capacity is diminished and manual remediation is required to figure out what caused the problem and to manually repair the session hot VMs. In order to automatically scale the virtual desktop environment, it would be beneficial to further automatically heal any broken hosts.

Accordingly, there is a need for systems and methods for managing a scale in process for a virtual desktop environment, as described herein.

One major benefit of public cloud environments are their utility-like, consumption-based billing. Unfortunately, the flexibility in configuring the various options available to a system administrator leads to a tremendous amount of complexity required to understand cost implications of choices made when configuring a virtual desktop environment. In many cases, it is only after the invoice is received at the end of the month that the costs are clear.

Any system that manages to incorporate scaling in virtual desktop environments to provide costs savings in compute and storage costs in a public cloud, consumption-driven environment, will have additional complexities in understanding the even more complex cost implications.

Accordingly, there is a need for systems and methods for providing dynamic cost estimation tools and visualization tools for a virtual desktop environment, as described herein.

BRIEF SUMMARY OF THE INVENTION

To meet the needs described above and others, the present disclosure provides systems and methods for automatically scaling up and down allocated capacity of a virtual desktop environment and for providing dynamic cost estimation tools and visualization tools for the scalable environment.

In order to facilitate a more complete and coherent description of the present subject matter, it is helpful to first describe and define key elements of the system. First, as used herein, a "VM" is a virtual machine. A "Virtual Desktop" is a streamed Windows® operating system session running on a VM in a cloud environment. However, it is understood that the operating system is not limited to a Windows-based system. In other embodiments, a Virtual Desktop may be provided using a different operating system. A "Multi-Session Desktop" is a VM hosting multiple virtual desktops sessions using a multi-session operating system (e.g., Windows Server or Windows 10 multi-session). A "Single-Session Desktop," also known as "Single User Desktop" is a virtual desktop session running on its own VM as the only desktop session on that VM. A "User Session" is a connection of a user to virtual desktop resource (i.e., session host). Sessions can be active (i.e., user currently logged into a virtual desktop) or disconnected (i.e., user was active on a virtual desktop session host, but has since disconnected without logging off). In a disconnected state, applications stay open on the virtual desktop session. A "Session Host" (or "Host") is a Windows VM acting as a provider of single-session or multi-session desktop sessions. A "Host Pool" is a collection of session hosts. Users connect to a host pool and are directed to one of the session host members of the pool depending on load and any related load balancing algorithm. A "Pooled Host Pool" is a host pool in which a desktop session is served from any session host VM, as determined by current load and load balancing algorithm. A "Personal Host Pool" is a host pool in which each user's desktop session is served by a specific/persistent session host VM. In a personal host pool, only one VM in a personal host pool can serve a single user. As used herein, "Scale Out" means increasing capacity of a host pool by powering on adding additional members session host VMs to the host pool. After the scale out completes, the new virtual desktop sessions will be "landed" on the newly added capacity. "Scale In" means decreasing capacity of a host pool by powering off or removing session host VMs. "Scale Up" means increasing capacity by sizing a VM up (e.g., the number of CPUs and/or GB of RAM). A scale up requires a reboot in order to make the change in capacity. "Scale Down" means decreasing capacity by sizing a VM down. A scale down requires a reboot to make the change in capacity. A "Connection Broker" is a software service that receives users' connection request to virtual desktops and decides which session host VM to which to route the session depending on load and any load balancing algorithm. Lastly, in "Drain Mode," session hosts do not accept any new connections, but any existing user sessions are unaffected.

In the systems and methods taught herein, a scale out mechanism is provided to detect increases in demand on the system and dynamically grow the system capacity to meet demand, rather than keeping the system capacity always on even when not used. Various examples are provided.

In the context of a virtual desktop environment, when a user connects to a host pool to which the user is assigned, a connection broker service uses a load-balancing algorithm to determine which session host VM to which to connect this user. For instance, with a "breadth first" load balancing algorithm, the session would be landed on the session host with the least number of sessions. In traditional virtual desktop environments, when the system is overloaded, meaning the user sessions exceed the system's available capacity, new sessions will either be denied (if the maximum session setting is set per host) or landed on already overloaded session hosts, which would lead to poor performance for the user. However, in the systems and methods taught herein, an auto-scale system scales out (i.e., grow capacity) when demand exceeds a certain user-defined threshold.

In the systems and methods provided herein, there are two types of capacity in a virtual desktop environment: (1) base capacity; and (2) burst capacity. Base capacity comprises a minimum number of VMs that are pre-provisioned and always available in the host pool. The VMs may be on or off, but they are created in advance (i.e., pre-provisioned) and are always available in the host pool. Base capacity VMs are quick to power on, since they already exist, but they constantly consume operating system (OS) disk storage, which means that they cost money even when not running. By contrast, burst capacity comprises VMs that are created on demand based on an auto-scale trigger. Burst capacity VMs do not consume resources until they are created (on demand), but they take longer to create than simply powering on the preexisting base capacity VMs.

In designing an auto-scale configuration for a virtual desktop environment, the first step is to define the possible host pool sizing in terms of the number of VMs and the number of powered on VMs at any given time.

For example, in some embodiments of the systems and methods provided herein, the active session host VM may be defined as: (1) VM Started; or (2) WVD Agent Available. VM Started means the active session host VM is a running VM. The VM is considered active regardless of whether it's available for connectivity for a virtual desktop session or not. WVD agent Available means a VM is reporting that it's available for virtual desktop session connection. The Base Host Pool Capacity is the number of VMs that are pre-provisioned and available in the host pool, at a minimum, at all times. The VMs are counted whether they are on or off. The Min Active Host Capacity is the number of VMs that are "active" at all times. The Burst Beyond Base Capacity is the number of VMs that can be created, on demand, above and beyond the base capacity "if needed".

In a primary embodiment of the systems and methods described herein, the host pool sizing definition provides the base capacity and burst capacity, from which one can derive the minimum size of the host pool (i.e., the base capacity) and the maximum size of the host pool (i.e., the base capacity plus the burst capacity). It also defines the minimum number of active VMs (i.e., the min active host capacity) and the maximum active VMs (i.e., the base capacity and the burst capacity). Each of these factors may be determined by user controls that enable an administrator to configure the system. Depending on how an administrator configures the system, it is contemplated that any given virtual desktop environment may include only base capacity, only burst capacity, or any combination of the two. The balance between the base capacity and the burst capacity can be optimized for quick start time, cost savings, performance, etc.

In the systems and methods provided herein, the actual size of the host pool at any given time is controlled by the scaling logic, which provides scale out control using two operations: (1) powering on the base capacity VMs; and (2) creating additional VMs from the available burst capacity.

With respect to the size of the host pool, the system may be configured to automatically make a certain amount of capacity available in anticipation of user demand (rather than in response to user demand). This is referred to herein as pre-staging capacity. For instance, if users of the virtual desktop environment typically start work at 8 AM Monday-Friday, the system may determine how long it takes to pre-stage the needed capacity so the system can begin pre-staging the appropriate base capacity and/or burst capacity early enough before 8 AM to have everything ready by 8 AM. The system may do so by calculating the average scale out duration and calculating the offset from 8 AM to begin the operation. For example, a pre-staging user control may include controls for setting which days of the week to perform a pre-staging operation, the time by which the pre-staging should be complete, and the number of hosts to be active by the time by which the pre-staging should be complete.

Once the pre-staging is complete and the system is in use, user defined scaling logic may control any scale out that takes place in the pooled host pool based on various factors such as: (1) CPU usage; (2) average active sessions per host; (3) available sessions; (4) user experience; (5) event-triggered; (6) machine learning based artificial intelligence triggers; etc. Similarly, user defined scaling logic may control any scale out in the personal host pool based on various factors such as: (1) work hours power on/off; (2) start VM on logon; etc.

In a first example, the user-defined scaling logic may include an auto-scale trigger based on CPU usage within the system. For example, the scaling logic may be defined such that the system creates a defined number of new hosts when CPU utilization across all hosts exceeds a defined percentage of capacity for a defined duration. Such a command may be "start or create (scale out) up to 1 host (s) if CPU utilization across all hosts exceeds 65% for 5 minutes."

This scaling logic allows the system to determine when the host pool is "getting busy" and, in anticipation of a new user login, add additional hosts. The duration variable allows the system to avoid scaling out when there are momentary CPU spikes and only scale out when there is sustained high CPU activity. Monitoring the average utilization across all existing hosts helps to identify when that system is getting busy. If the CPU usage is already very high (i.e., running into the limits), adding more capacity is "too late" because the existing users who are already connected to hosts in the host pool are already overwhelming their hosts. Accordingly, it is important to add capacity before the system becomes too busy, so users are more equally balanced and user performance is not adversely affected. Setting the number of hosts to scale out informs the system of the batch size of the number of hosts that will be added, either powered on (e.g., base capacity) or created (e.g., burst capacity), once the CPU threshold is tripped. In small environments, adding a single host at a time may be sufficient, but in very large environments, with a high "user arrival rate," it may be necessary to add multiple hosts to the host pool at the same time to accommodate the high demand.

In a second example, the user-defined scaling logic may include an auto-scale trigger based on the average active sessions per host within the system. For example, the scaling logic may be defined such that the system creates a defined number of new hosts when the average active sessions per host exceeds a defined number. Such a command may be "start or create (scale out) up to 1 host (s) if the average active sessions across all hosts exceeds 1." In this example, when the average active sessions across all hosts in the host pool exceed a certain value, the system automatically adds capacity by either powering on base capacity VMs or creating new burst capacity VMs. This is a trigger that can be used when the number of sessions a host can accommodate is known. For example, if a host can accommodate 10 sessions, it may be useful to add more session hosts when the average exceeds 8 or 9. In this example, the number of hosts to add can be 1 or more. In small environment adding hosts in batches of 1 may be sufficient. In large environments, with high user arrival rates, it may be necessary to add hosts in larger batches.

In a third example, the user-defined scaling logic may include an auto-scale trigger based on the available sessions within the system. For example, the scaling logic may be defined such that the system creates a defined number of new hosts when the number of available sessions drops below a defined number. Such a command may be "maintain up to 5 available sessions, subject to host pool sizing maximum base capacity plus burst capacity."

In this example, the system automatically maintains a pre-defined number of available sessions in the virtual desktop environment up to the maximum capacity (i.e., base capacity plus burst capacity). In this scenario, the number of sessions a host can accommodate is known and the system is told to maintain a "buffer" of available sessions. As users login, the number of available sessions decreases. Once the number of available sessions falls below the specified buffer, new hosts are either powered on (e.g., base capacity) or created (e.g., burst capacity) and the buffer grows.

In this example, it is important to know how many sessions a host can accommodate, otherwise there is no way to know how many available sessions there are at any given time. When the number of sessions a host can accommodate is known, the system will behave as follows. The host pool sizing determines the minimum number of active hosts. This number is multiplied by the maximum sessions per host to get the initial buffer size. As users log in, the number of available sessions decreases. Once the number of available sessions is below the specified amount (e.g., 5), another host is made active by powering on additional base capacity or by creating hosts from the burst capacity. The buffer then grows by the maximum sessions per host multiplied by the number of new hosts. This continues until all host capacity is on, at which point the buffer will continue to decrease down to 0.

In a fourth example, the user-defined scaling logic may include an auto-scale trigger based on the user virtual desktop experience. The user virtual desktop experience can be measured in terms of input delay latency or other metrics that represents how well the user's virtual desktop session is responding. As the system gets busier, the responsiveness decreases and user experiences becomes worse. An auto-scale trigger can be based on user experience decreasing below a certain threshold. When this happens, the auto-scale logic will add new capacity to the host pool by either powering on or creating new VMs. As with other auto-scale triggers, the batch size can be customized.

In a fifth example, the user-defined scaling logic may include an auto-scale trigger based on various real-world events. For example, various real-world events can signal that users are ready to start work and sufficient capacity should be made available to accommodate their logins. For instance, there may be a sensor in the parking garage of an office building that measures how full it is and communicates this value to the system. Once the system recognizes that the garage is above a certain percentage full (i.e., a user-defined capacity), the auto-scale logic may create additional capacity for a given number of users. Each time more cars arrive in excess of the user-defined capacity, or the garage is an additional percentage full, the system automatically scales out to create additional capacity while the users are making their way to the office.

In a sixth example, historical information about user logins over a period of time can be used to derive a schedule based on which the host pool should scale out in anticipation of (i.e., not in response to) user demand. During normal work days/hours, the system may scale out in anticipation of user logins. During holidays, the system may not scale out since the system anticipates that no user demand (or reduced/limited user demand) will be coming.

The six examples above are all directed to auto-scaling logic that is applied to a pooled host pool. In some virtual desktop environments, personal desktops are persistently assigned to individual users. In these personal host pool systems, it is not possible to add arbitrary session host VMs and make them available to users when they are needed or remove extra VMs when they are not needed, because each user must use their own desktop VM and cannot user any others. Therefore, a special type of auto-scaling mechanism is needed for personal host pool systems in which it is not possible to create and delete VMs on demand, it is only possible to power on VMs when they are needed. The following two examples: (1) work hours power on/off; and (2) start VM on logon are provided to show how an auto-scaling logic that can be applied in a personal host pool environment.

In a first example, working hours are defined. For example, working hours may be set for Monday through Sunday, 8 AM to 6 PM Central Time (UTC-06:00). Settings may be provided for "power off aggressiveness" (e.g., low, medium, or high) and "power on timing" (e.g., once or continuous). The power off aggressiveness defines how quickly the system reacts to turn off the VMs in response to non-use or manual power down. When the power on timing is set to once, the VMs are powered on a single time in response to the opening of a working hours window (and therefore can be powered off by user action). When the power on timing user control is set to continuous, the VMs remain powered on during working hours, even if the user or administrator attempts to power on or more of the VMs off manually.

In a second example, the auto-scale logic automatically powers on personal desktop session host VMs when a user login is detected. In one example, in response to a user initiated a login request, the request is received by the connection broker service and the logged in database. The auto-scaling logic system then receives a trigger event or proactively polls the connection broker service and logged in database. When the system recognizes a login attempt for a powered off personal desktop VM, the auto-scaling logic causes the appropriate personal desktop session host VM automatically starts.

The examples above describe scale out logic for virtual desktop environments. However, after a host pool is scaled out (whether a pooled host pool or personal host pool), if it is not scaled back in, the system is no better than a non-auto-scaling scenario in which there is more capacity allocated than is needed and costs are needlessly high. Therefore, to provide the objectives and advantages of the systems and methods described herein, the systems and methods include a mechanism to scale in (i.e., reduce capacity) of a host pool when the excess capacity is no longer needed.

When implementing a scale in mechanism, it is important to recognize that virtual desktop sessions are tied to a specific VM. It is currently not possible to dynamically "move" a virtual desktop session from one VM to another without logging the user out of their current session, which requires saving all data and closing all applications. Therefore, it is important to consider all of the implications when scaling in capacity to make it as non-disruptive as possible to the end-users while at the same time optimizing cost savings.

The following paragraphs describe six examples of auto-scaling logic for scaling in a virtual desktop environment in a pooled host pool environment. The six examples demonstrate how the scale in logic may be triggered by: (1) CPU usage; (2) average active sessions; (3) available sessions; (4) event triggers; (5) user experience; and (6) work hour schedules.

In an example of auto-scaling logic applied to a scale in process based on CPU usage, scale in occurs once the CPU usage drops below a pre-configured threshold and stays there for the defined number of minutes. Once this condition is met, a specified batch of VMs is stopped or removed. For example, the logic may be defined such that the system stops or removes (i.e., scales in) up to 1 host(s) when CPU utilization across all hosts drops below 40% for 15 minutes.

In an example of auto-scaling logic applied to a scale in process based on average active sessions, scale in occurs once the average active sessions per host falls below a pre-defined number. At that point, VMs are removed in defined batch sizes. For example, the logic may be defined such that the system stops or removes (i.e., scales in) up to 1 host(s) when the average active sessions across all hosts falls below 1.

In an example of auto-scaling logic applied to a scale in process based on available sessions, scale in occurs once the pool of available sessions exceeds the minimum buffer. In response to the pool of available sessions exceeding the minimum buffer, hosts are powered off or removed as long as doing so maintains the minimum buffer after the operation. For example, if the minimum buffer is 5, each host can accommodate 10 sessions, and there are currently 14 available sessions, scaling in 1 host would result in 4 sessions being available (i.e., less than the minimum buffer) and, therefore, the host would not be shut down. In the same scenario, if there were 15 available sessions, then a host would be scaled in to reduce consumption without violating the minimum buffer requirement.

In an example of auto-scaling logic applied to a scale in process based on event triggers, when the number of cars in the monitored parking garage drops below a certain threshold, one or more hosts are scaled in as the parking capacity indicates that users are not in the office.

In an example of auto-scaling logic applied to a scale in process based on user experience, if user experience increases above a certain level, VMs are scaled in to remove unneeded capacity.

As with the scale out functions described above, the scale in function may apply to either pooled host pools or personal host pools. For example, in a personal host pool setting, the auto-scale logic may be based on typical office hours. After a specified time (e.g., 6 PM), if the VM is not in use, it may be automatically powered down. The power down function may be applied once or continuously. When the power down timing is set to once, the VMs are powered down a single time in response to the closing of a working hours window (and therefore can be powered on by user action). When the power down timing user control is set to continuous, the VMs remain powered off during non-working hours, even if the user or administrator attempts to power one or more of the VMs on manually.

Each of the examples of scale in logic may be subject to one or more scale in restrictions. Scale in restrictions are used to promote optimized balances of cost savings vs. end-user experience. Scale in restriction settings impose restrictions on the scenarios in which scale in can occur to avoid being overly disruptive to end users. For example, scale in should not occur during lunch hour when the system utilization drops simply because users are away from their desk. Scaling in at this time would not only cause users sessions to be disconnected, which will close their applications, but will also require a scale out to occur within an hour when users come back to their desks and resume their work. Therefore, it may be valuable to enable a user to set time periods within which scale in can occur and/or time periods in which scale in cannot occur.

In addition, the systems and methods provided herein may be subject to user controls over the scale in aggressiveness. When scaling in, VMs are either shut down or destroyed (depending on base capacity vs. burst capacity settings). Either approach is disruptive to any users currently logged into these VMs. The scale in aggressiveness user settings allow system administrators to balance user disruption with cost savings. For example, in a primary embodiment, there may be three user defined aggressiveness settings: low; medium; and high.

In this example, if the system administrator chooses to set the scale in aggressiveness setting to low, only hosts that have zero active and disconnected sessions will be scaled in. The system continuously monitors the virtual desktop environment for presence of such hosts and scales them in during the allowed time window (i.e., subject to the scale in restrictions described above). This setting results in the least amount of user disruption (e.g., no user disruption), but is not guaranteed to produce any cost savings if users are not disciplined about logging out of their virtual desktops when they are done using them.

In this example, if the system administrator chooses to set the scale in aggressiveness setting to medium, those hosts that have no active session (i.e., those hosts with either no session at all or only disconnected sessions) can be scaled in during the allowed times. This results in disruption to disconnected sessions (i.e., applications are closed), but is more likely to produce compute saving by removing underutilized VMs.

In this example, if the system administrator chooses to set the scale in aggressiveness setting to high, all hosts above the minimum active capacity are scaled in regardless of whether or not they have sessions. In prioritizing the scale in target VMs, the system may first choose to scale in those hosts with no sessions. Once the first group of hosts are scaled in, the system may then choose to scale in those hosts that have the least number of sessions, set the host to drain mode (i.e., prevent any new connections), send the users a warning message on their virtual desktop screen to give them X minutes to log out and log back in. For example, the user control may allow the administrator to define the number of minutes warning the users are given before scaling the host. The warning message may say something like, "Sorry for the interruption. We are doing some housekeeping and need you to log out. You can log in right away and continue working. We will be terminating your session in 10 minutes if you have not logged out by then." When the users log out and then back in, they are connected to a different host that is not in drain mode. The system continues this process until either the utilization becomes appropriately high or the minimum number of active hosts is reached. In this high setting scale in aggressiveness scenario, scale in savings are very likely because all underutilized capacity will be scaled in when possible.

In some examples of the systems and methods provided herein, the auto-scaling system includes an auto-heal function for session host VMs. In such embodiments, the auto-scaling system is continuously monitoring the status of the session hosts and is aware of any changes from a "healthy" state to a "broken" state in order to take prescriptive actions to repair broken hosts.

In one example, session host status is provided by a WVD agent, which is software installed inside of each session host that facilitates a connection between the end-user and the VM serving the virtual desktop session. The WVD agent has broad visibility of what is happening on the VM and reports the status back to the WVD management service. The normal status is Available. There are several other states that can indicate a problem with the VM, including, for example: Unavailable; FSLogix not healthy; No heartbeat; SxS stack listener not ready; Shutdown; Disconnected; Upgrading; Update failed; Not joined to domain; Domain trust relationship lost; and Needs assistance.

An auto-heal broken hosts GUI provides the system administrator with the ability to define what constitutes a broken host (some status may be normal or transient in some environments) and configure an action of what to do when a broken host is detected. The auto-scaling system kicks into action auto-healing broken hosts after it has fully scaled out the environment to avoid dealing with "maintenance" type tasks when more capacity needs to be brought online. Once the scale out process is complete, the auto-scaling system can start healing any broken hosts.

As part of the configuration defining a broken host, the administrator can also specify whether a broken host should be repaired if it has any user sessions on it. It is possible for users to have connected to a host before the host went into broken state. The administrator can configure whether hosts with any session, or with active sessions, should be acted upon or not.

In some examples, the remediation actions can be a combination of: restarting the session hosts one or more times, with delays in between the attempts; deleting and re-creating the session hosts from golden image; and other actions that depend on the broken session host status. For example, the system administrator can define the number of restart attempts, the time (e.g., in minutes) between restart attempts, and how to handle unrecoverable hosts (e.g., remove and re-create).

Various embodiments of the systems and methods provided herein include dynamic, in-line cost estimation to the user (e.g., system administrator) while they are configuring the dynamic host pool auto-scaling. This allows the user to immediately see the impact of the selected configuration choices without having to open a separate spreadsheet or calculator application. The cost estimation tool provides the user with the "boundaries" of the possible costs. That is, the minimum and maximum possible costs across two dimensions of compute and storage, which constitute the 90%+ of the total cost of the typical virtual desktop environment.

For example, the user interface through which the auto-scaling logic is controlled may include a chart providing the estimated monthly costs for the minimum and maximum costs for the compute and for the storage capacity.

The compute cost is the cost of virtual machine compute capacity. This depends on the geographic region, selected VM family, amount of CPU/RAM/storage and other factors. Compute costs are incurred only by VMs that are running. Stopped (i.e., deallocated) VMs exist, but they do not consume compute costs.

The storage cost is the cost of operating system disk storage that is attached to a VM. Factors that contribute to the storage cost include the cost of storage demands on the geographic region where it exists, the type of disk (premium SSD, standard SSD, HDD, etc.), and the size of the storage disk. Costs for storage are incurred regardless if whether the VM that it's attached to is running or stopped. The only time storage costs stop being incurred is when the VM and its associated OS disk is deleted (e.g., removal of burst capacity).

The minimum cost is the cost of compute/storage under the assumptions that the system will stay at its minimum (i.e., scaled in) size and never scale out. The cost of storage depends on: (1) the number of base host pool capacity VMs, since these always exist and the OS disks consume costs; and (2) the cost of storage of any additional VMs that get created during pre-staging that are above the base capacity for the duration between pre-stage time and beginning of scale in restriction time. The cost of compute depends on: (1) the minimum active host capacity as this is the amount of computer that will be running 24/7 at a minimum; and (2) the cost of compute of pre-staged capacity between the hours of beginning of work hours (i.e., pre-stage time) and beginning of scale in restrictions.

The maximum cost is the cost of compute/storage under the assumption that the system will scale out to its maximum size and never scale in. The maximum cost of storage is based on the maximum host pool size. That is the base capacity plus burst capacity running at all times. The maximum cost of compute is similarly based on assuming the system runs at all times.

Some embodiments of the systems and methods taught herein capture actual compute and storage utilization on a minute-by-minute basis. This allows the systems to understand the "actual" costs of an environment, which is what the user would see when they receive their invoice. However, also knowing the configuration of a particular host pool and its auto-scale settings, these systems can understand the minimum possible costs (i.e., if system never scales out), maximum possible costs (i.e., if system scales out and never scales back in), peak costs (i.e., if the host pool is statically sized to accommodate peak demand—somewhere between actual and maximum costs) and, as a result, can derive the savings delivered by the auto-scaling processes.

In some embodiments, costs and savings may be captured graphically at the host pool level and then viewed over any selected period of time. For example, the system may automatically scale out days days per week based on schedule and user demand and scale back in two days per week when it's no longer needed. Savings are reflected as the difference between the peak costs (i.e., what it would cost to run the system statically powered on for the selected duration at its highest usage over the period) and actual costs.

Seeing costs and savings data on a per host pool basis is useful to understand past behavior, but it is useful to see this information on an aggregated basis over a standard period of time (e.g., a month) and over multiple host pools grouped into workspaces. This aggregation over time allows the user to understand the complete costs and auto-scale savings with respect to the entire virtual desktop environment.

Understanding historical costs is helpful, but ultimately decision makers need to understand the projected costs over a standardized period of time (e.g., a month). The systems and methods taught herein enable accurate monthly projections about monthly savings as a result of auto-scaling based on a short sample period of data collection. This data is extrapolated over the standardized period and can be presented in-line at the host pool and workspace level.

With cloud computing costs being "infrastructure size" dependent (e.g., VM size, OS disk type, etc.) and each unit of infrastructure being able to deliver services to a unpredictable number of individual users (i.e., employees), it is difficult to understand the cost of a complex technology like virtual desktops, especially with auto-scaling, on a per user basis. Because the systems and methods described herein provide visibility into utilization by users, possible auto-scale size ranges of the infrastructure, and actual costs incurred by the infrastructure in response to user demand, it is possible to calculate projected, standardized unit costs on a per-user basis.

In one embodiment, a system for dynamically auto-scaling allocated capacity of a virtual desktop environment includes: a scalable virtual desktop environment comprising a base capacity resources, including base compute resources and base storage resources, and a burst capacity resources, including burst compute resources and burst storage resources; a server including a controller controlling the operation of the base capacity resources and the burst capacity resources; a memory coupled to the controller, wherein the memory is configured to store program instructions executable by the controller; wherein, in response to executing the program instructions, the controller is configured to: in response to receiving a log in request from a first user device, connect the first user device to a first host pool to which the first device user is assigned; execute a load-balancing module to determine a first session host virtual machine to which to connect the first user device; and execute an auto-scaling module comprising a user-selectable auto-scaling trigger and a user-selectable conditional auto-scaling action, wherein, in response to recognition of the conditional auto-scaling action, the controller powers on or powers off one or more base capacity resources or creates or destroys one or more burst capacity resources.

The controller may be further configured to: in response to receiving a log in request from a first user device, connect a second user device to a second host pool to which the second device user is assigned.

The controller may be further configured to provide a host pool sizing tool including user controls for defining an active host, a base host pool capacity, a minimum active host capacity, and a burst beyond base capacity.

The controller may be further configured to provide a pre-stage hosts tool including user controls for defining one or more work days, a start of work hours, and a number of hosts to be active by the start of work hours.

The controller may be further configured to provide a CPU usage scaling out logic tool including user controls for an auto-scale trigger selection and a number of host to scale out when the CPU utilization exceeds a given capacity for a given duration.

The controller may be further configured to provide an average active sessions per host scaling out logic tool including user controls for an auto-scale trigger selection and a number of host to scale out when the average active sessions per host exceeds a given number.

The controller may be further configured to provide an available sessions scaling out logic tool including user controls for an auto-scale trigger selection, a maximum sessions per host, and a minimum number of available sessions that need to be maintained at all times.

The controller may be further configured to provide a working hours scaling out logic tool including user controls for a day of the week selection tool, a time range selection tool, a setting for power off aggressiveness, and a setting for power on timing.

The controller may be further configured to provide a CPU usage scaling logic tool including user controls for scale out and scale in definitions including an auto-scale trigger selection and a number of host to scale out when the CPU utilization exceeds a given capacity for a given duration, and a number of hosts to scale in when the CPU utilization drops below a given capacity for a given duration.

The controller may be further configured to provide an average active sessions scaling logic tool including user controls for scale out and scale in definitions including an auto-scale trigger selection and a number of host to scale out when the average active sessions across all hosts exceeds a given value, and a number of hosts to scale in when an average active sessions across all hosts is below a given value.

The controller may be further configured to provide a scale in restrictions tool including user controls for selecting times in which scale in will be restricted and a level of scale in aggressiveness to apply.

The controller may be further configured to provide a scale in messaging tool including user controls for when to send a message relative to a scale in action and a control for editing a message to be sent.

The controller may be further configured to provide e an auto-heal broken hosts tool including a user controls defining how to identify when to heal a broken session host, including applicable WVD agent statuses and whether hosts with any session or with active sessions should be acted upon, a number of restart attempts, a time between restart attempts, and how to handle unrecoverable hosts.

An object of the invention is to provide automatic scaling features (scaling in and scaling out) in a virtual desktop environment so as to optimize the cost vs. performance characteristics of the environment.

Another object of the invention is to provide tools for scaling in a virtual desktop environment with minimal disruption to users that are logged into the environment.

An additional object of the invention is to provide dynamic cost estimation and visualization tools that empower system administrators to better understand the cost implications of the user directed scaling logic.

An advantage of the invention is the user directed scaling logic allows a system administrator to control triggers and responses in the logic to provide greater flexibility and adaptability.

Another advantage of the invention is the user directed scaling logic allows a system administrator to balance disruption vs. cost savings.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 8 illustrates a CPU usage scaling logic tool including scale out and scale in definitions.
FIG. 13 illustrates a dynamic cost estimation GUI.
FIG. 15 illustrates an aggregated cost and savings display at host pool level over a month.
FIG. 16 illustrates an aggregated cost and savings display at workspace level over a month.
FIG. 17 illustrates a projected costs display at a host pool level.
FIG. 18 illustrates a projected costs display at a workspace level.
FIG. 19 illustrates a projected monthly unit cost display for per-named and per concurrent user on the host pool level.
FIG. 20 illustrates a projected monthly unit cost display for per-named and per concurrent user on the workspace level.

DETAILED DESCRIPTION OF THE INVENTION

Figure 1:
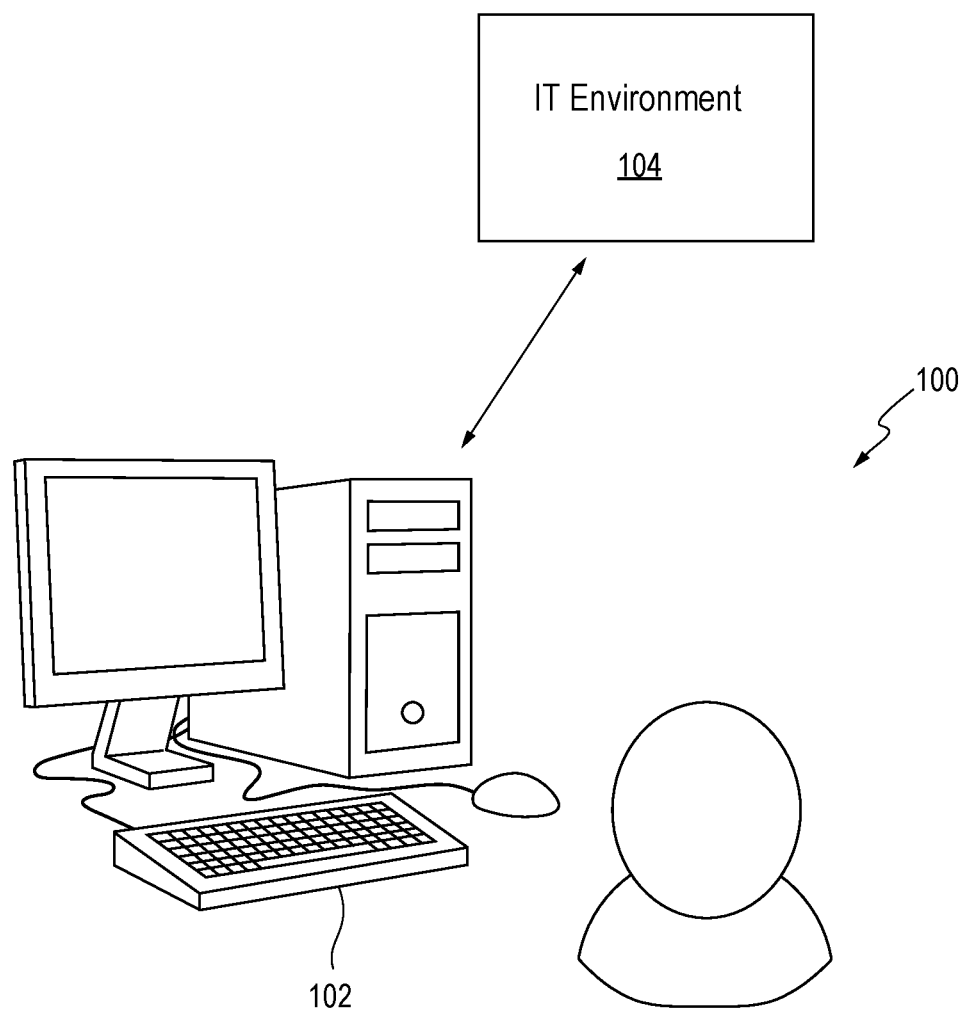
FIG. 1 is a schematic of a system for automatically scaling up and down allocated capacity of a virtual desktop environment.

FIG. 1 illustrates a schematic of a system for automatically scaling up and down allocated capacity of a virtual desktop environment 100 (system 100). As shown in FIG. 1, the system 100 includes a user device 102 in communication with an IT environment 104. The user device 102 shown in FIG. 1 is a personal computer (PC). In the example shown in FIG. 1, the various tools, controls, GUIs (i.e., graphical user interfaces), displays, described below with reference to FIGS. 2-20 are presented to the user through the user device 102. Although shown as a PC in FIG. 1, in alternative embodiments, the user device 102 can be a mobile device, such as a smartphone or tablet, a server, or any other computing device through which a user, such as a system administrator, may interact with the IT environment 104 to perform the features and functions described herein.

FIGS. 2-20 illustrate various user controls and displays for executing the features and functions in an example embodiment of the system 100. As noted above, in a primary embodiment, the various user controls and displays described with reference to FIGS. 2-20 are presented to, and controlled by, a user through the user device 102.

In the systems and methods provided herein, there are two types of capacity in a virtual desktop environment: (1) base capacity; and (2) burst capacity. Base capacity comprises a minimum number of VMs that are pre-provisioned and always available in the host pool. The VMs may be on or off, but they are created in advance (i.e., pre-provisioned) and are always available in the host pool. Base capacity VMs are quick to power on, since they already exist, but they constantly consume operating system (OS) disk storage, which means that they cost money even when not running. By contrast, burst capacity comprises VMs that are created on demand based on an auto-scale trigger. Burst capacity VMs do not consume resources until they are created (on demand), but they take longer to create than simply powering on the preexisting base capacity VMs.

In designing an auto-scale configuration for a virtual desktop environment, the first step is to define the possible host pool sizing in terms of the number of VMs and the number of powered on VMs at any given time.

Figure 2:
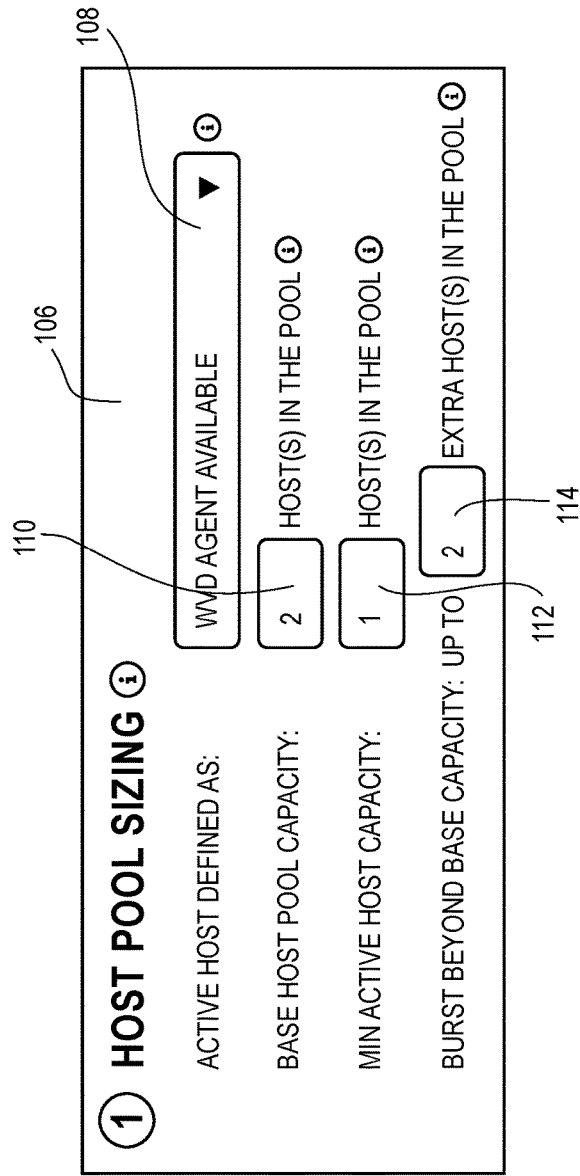
FIG. 2 illustrates a host pool sizing tool.

For this purpose, FIG. 2 illustrates a host pool sizing tool 106 providing user controls including: a active host control 108 (e.g., VM started vs. WVD Agent Available), a base host pool capacity control 110 (e.g., the number of hosts in the pool), a minimum active host capacity control 112 (e.g., the number of hosts in the pool), and a burst beyond base capacity control 114 (e.g., up to X extra hosts in the pool).

Using the active host control 108 shown in FIG. 2, the active session host VM may be defined as: (1) VM Started; or (2) WVD Agent Available. VM Started means the active session host VM is a running VM. The VM is considered active regardless of whether it's available for connectivity for a virtual desktop session or not. WVD agent Available means a VM is reporting that it's available for virtual desktop session connection.

The base host pool capacity control 110 defines the number of VMs that are pre-provisioned and available in the host pool, at a minimum, at all times. The VMs are counted whether they are on or off.

The minimum active host capacity control 112 defines the number of VMs that are "active" at all times.

The burst beyond base capacity control 114 defines the number of VMs that can be created, on demand, above and beyond the base capacity "if needed".

In a primary embodiment of the systems 100 and methods described herein, the host pool sizing definition controlled by the host pool sizing tool 106 provides the base capacity and burst capacity, from which one can derive the minimum size of the host pool (i.e., the base capacity) and the maximum size of the host pool (i.e., the base capacity plus the burst capacity). It also defines the minimum number of active VMs (i.e., the min active host capacity) and the maximum active VMs (i.e., the base capacity and the burst capacity). Each of these factors may be determined by the user controls that enable an administrator to configure the system 100. Depending on how an administrator configures the system 100, it is contemplated that any given virtual desktop environment may include only base capacity, only burst capacity, or any combination of the two. The balance between the base capacity and the burst capacity can be optimized for quick start time, cost savings, performance, etc.

In the systems 100 and methods provided herein, the actual size of the host pool at any given time is controlled by scaling logic, which provides scale out control using two operations: (1) powering on the base capacity VMs; and (2) creating additional VMs from the available burst capacity.

With respect to the size of the host pool, the system 100 may be configured to automatically make a certain amount of capacity available in anticipation of user demand (rather than in response to user demand). This is referred to herein as pre-staging capacity. For instance, if users of the virtual desktop environment typically start work at 8 AM Monday-Friday, the system 100 may determine how long it takes to pre-stage the needed capacity so the system 100 can begin pre-staging the appropriate base capacity and/or burst capacity early enough before 8 AM to have everything ready by 8 AM. The system 100 may do so by calculating the average scale out duration and calculating the offset from 8 AM to begin the operation. For example, a pre-staging user control may include controls for setting which days of the week to perform a pre-staging operation, the time by which the pre-staging should be complete, and the number of hosts to be active by the time by which the pre-staging should be complete.

Figure 3:
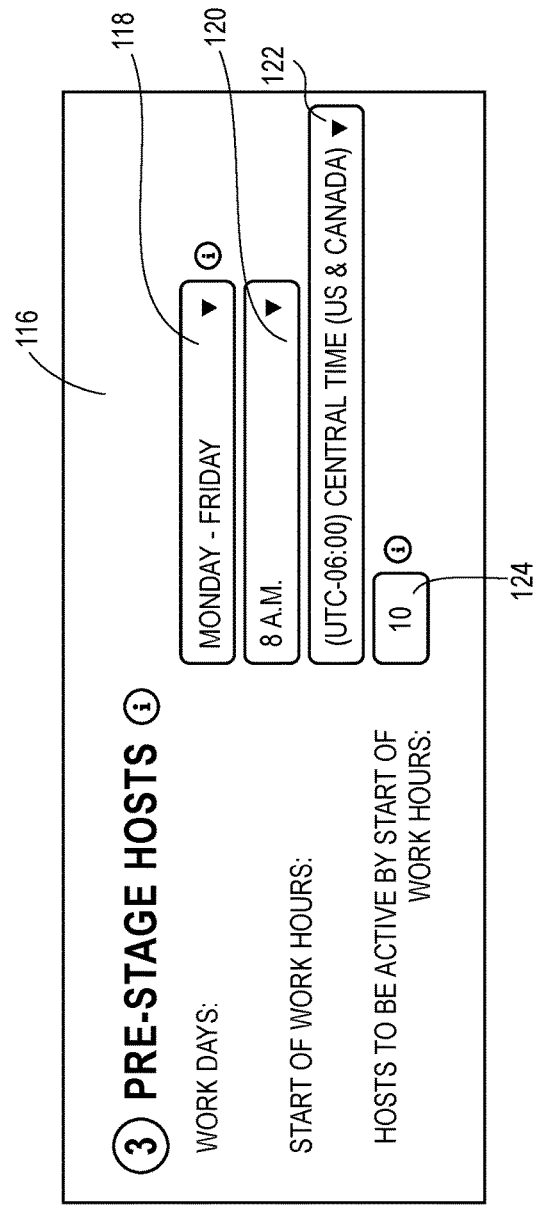
FIG. 3 illustrates a pre-stage hosts tool.

To perform such tasks, FIG. 3 illustrates an example of a pre-stage hosts tool 116 providing user controls including: a work days control 118 (e.g., the days of the week considered to be the work week), a work hours control 120 (e.g., what time the work day begins), and a number of hosts to be active by the start of work hours control 122. This is an example of a pre-stage hosts tool 116 a user, such as a system administrator, may use to control the pre-stage hosts functions of the system 100.

Once the pre-staging is complete and the system 100 is in use, user defined scaling logic may control any scale out that takes place in the pooled host pool based on various factors such as: (1) CPU usage; (2) average active sessions per host; (3) available sessions; (4) user experience; (5) event-triggered; (6) machine learning based artificial intelligence triggers; etc. Similarly, user defined scaling logic may control any scale out in the personal host pool based on various factors such as: (1) work hours power on/off; (2) start VM on logon; etc.

Figure 4:
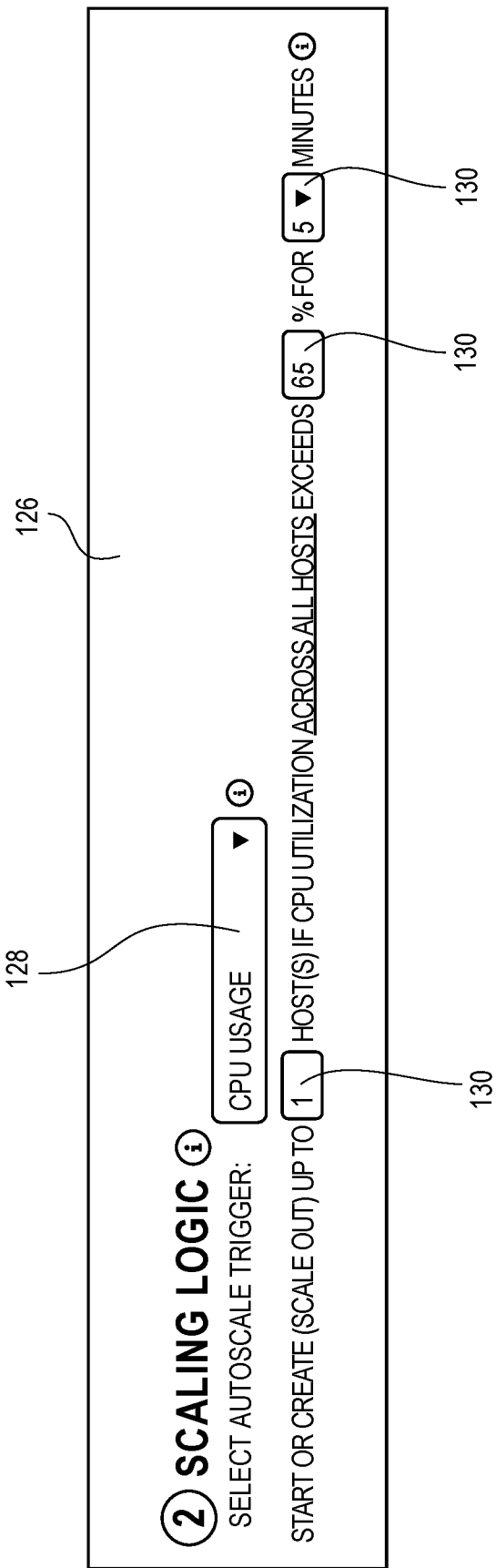
FIG. 4 illustrates a CPU usage scaling logic tool.

In a first example, the user-defined scaling logic may include an auto-scale trigger based on CPU usage within the system 100. An example of a CPU usage scaling out logic tool 126 is shown in FIG. 4. The CPU usage scaling out logic tool 126 shown in FIG. 4 includes an auto-scale trigger selection control 128 and a CPU usage scaling out logic threshold control 130 through which a user defines a number of hosts to scale out when the CPU utilization exceeds a given capacity for a given duration.

As shown, the scaling logic may be defined such that the system 100 creates a defined number of new hosts when CPU utilization across all hosts exceeds a defined percentage of capacity for a defined duration. Such a command may be "start or create (scale out) up to 1 host (s) if CPU utilization across all hosts exceeds 65% for 5 minutes" with the user defined variables including: (i) the number of hosts to scale out; (ii) the utilization threshold that, when exceeded, triggers the scaling out; and (iii) the length of time the threshold must be exceeded before the scaling out occurs.

The scaling logic of the CPU usage scaling out logic tool 126 shown in FIG. 4 allows the system 100 to determine when the host pool is "getting busy" and, in anticipation of a new user login, add additional hosts. The duration variable allows the system 100 to avoid scaling out when there are momentary CPU spikes and only scale out when there is sustained high CPU activity. Monitoring the average utilization across all existing hosts helps to identify when that system 100 is getting busy. If the CPU usage is already very high (i.e., running into the limits), adding more capacity is "too late" because the existing users who are already connected to hosts in the host pool are already overwhelming their hosts. Accordingly, it is important to add capacity before the system 100 becomes too busy, so users are more equally balanced and user performance is not adversely affected. Setting the number of hosts to scale out informs the system 100 of the batch size of the number of hosts that will be added, either powered on (e.g., base capacity) or created (e.g., burst capacity), once the CPU threshold is tripped. In small environments, adding a single host at a time may be sufficient, but in very large environments, with a high "user arrival rate," it may be necessary to add multiple hosts to the host pool at the same time to accommodate the high demand.

Figure 5:
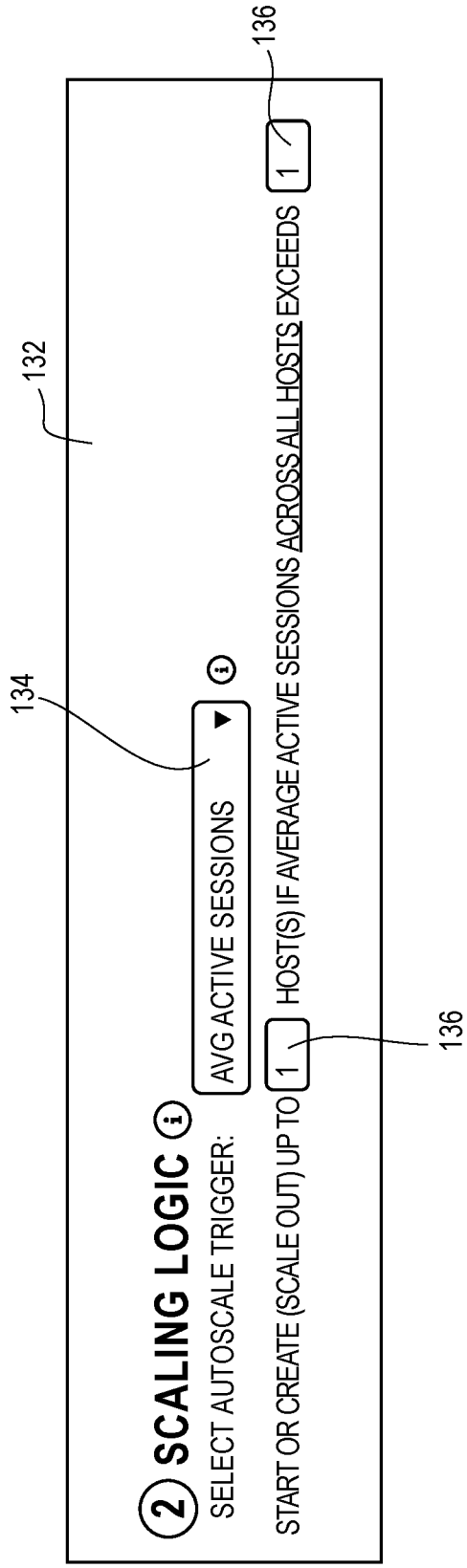
FIG. 5 illustrates an average active sessions per host usage scaling logic tool.

In a second example, the user-defined scaling logic may include an auto-scale trigger based on the average active sessions per host within the system 100. An example of an average active sessions per host scaling out logic tool 132 is shown in FIG. 5. The average active sessions per host scaling out logic tool 132 shown in FIG. 5 includes an average active sessions per host scaling out logic tool 132 including an auto-scale trigger selection control 134 and an average active sessions per host scaling out threshold control 136 through which a user defines a number of host to scale out when the average active sessions per host exceeds a given number.

As shown in FIG. 5, the scaling logic may be defined such that the system 100 creates a defined number of new hosts when the average active sessions per host exceeds a defined number. Such a command may be "start or create (scale out) up to 1 host (s) if the average active sessions across all hosts exceeds 1" with the user defined variables including: (i) the number of hosts to scale out; and (ii) the average active sessions threshold that, when exceeded, triggers the scaling out.

In the example shown in FIG. 5, when the average active sessions across all hosts in the host pool exceed a certain value, the system 100 automatically adds capacity by either powering on base capacity VMs or creating new burst capacity VMs. This is a trigger that can be used when the number of sessions a host can accommodate is known. For example, if a host can accommodate 10 sessions, it may be useful to add more session hosts when the average exceeds 8 or 9. In this example, the number of hosts to add can be 1 or more. In small environment adding hosts in batches of 1 may be sufficient. In large environments, with high user arrival rates, it may be necessary to add hosts in larger batches.

Figure 6:
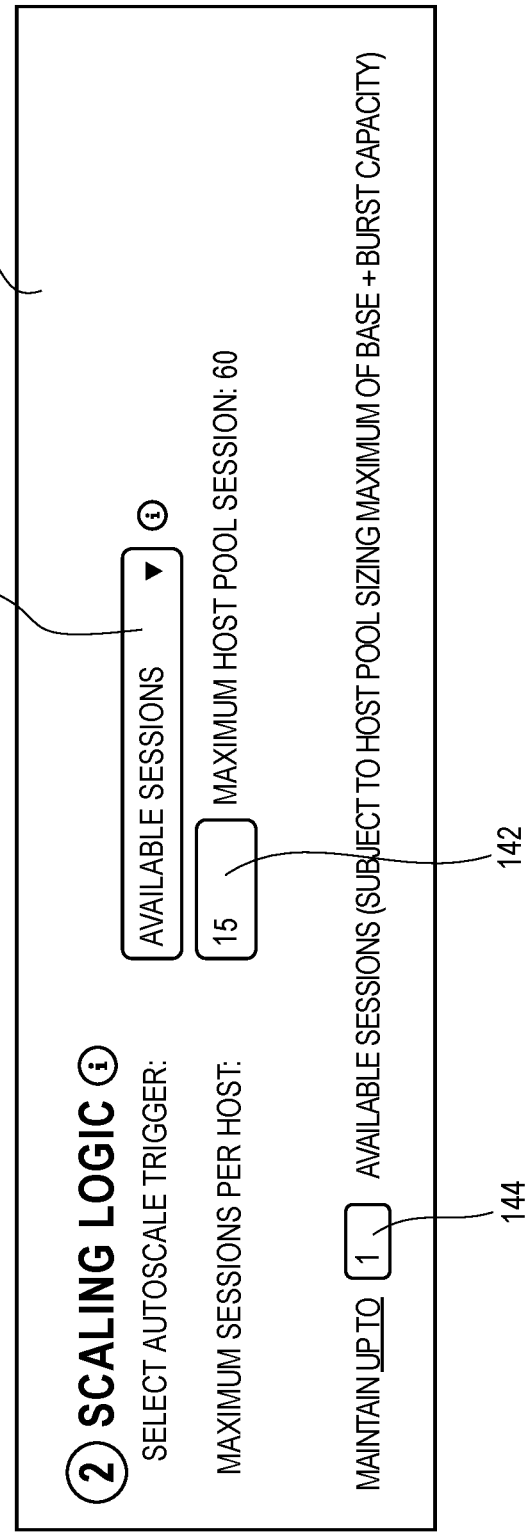
FIG. 6 illustrates an available sessions scaling logic tool.

In a third example, the user-defined scaling logic may include an auto-scale trigger based on the available sessions within the system 100. An example of an available sessions scaling out logic tool 138 is shown in FIG. 6. The available sessions scaling out logic tool 138 shown in FIG. 6 includes an auto-scale trigger control 140, a maximum sessions per host control 142, and a minimum sessions control 144 through which a user defines a maximum number of available sessions that need to be maintained at all times.

As shown in FIG. 6, the scaling logic may be defined such that the system 100 creates a defined number of new hosts when the number of available sessions drops below a defined number. Such a command may be "maintain up to 5 available sessions, subject to host pool sizing maximum base capacity plus burst capacity" with the user defined variables including: (i) a maximum number of host pool sessions; and (ii) a limit of the available sessions.

In the example shown in FIG. 6, the system 100 automatically maintains a pre-defined number of available sessions in the virtual desktop environment up to the maximum capacity (i.e., base capacity plus burst capacity). In this scenario, the number of sessions a host can accommodate is known and the system is told to maintain a "buffer" of available sessions. As users login, the number of available sessions decreases. Once the number of available sessions falls below the specified buffer, new hosts are either powered on (e.g., base capacity) or created (e.g., burst capacity) and the buffer grows.

In this example, it is important to know how many sessions a host can accommodate, otherwise there is no way to know how many available sessions there are at any given time. When the number of sessions a host can accommodate is known, the system 100 will behave as follows. The host pool sizing determines the minimum number of active hosts. This number is multiplied by the maximum sessions per host to get the initial buffer size. As users log in, the number of available sessions decreases. Once the number of available sessions is below the specified amount (e.g., 5), another host is made active by powering on additional base capacity or by creating hosts from the burst capacity. The buffer then grows by the maximum sessions per host multiplied by the number of new hosts. This continues until all host capacity is on, at which point the buffer will continue to decrease down to 0.

In a fourth example, the user-defined scaling logic may include an auto-scale trigger based on the user virtual desktop experience. The user virtual desktop experience can be measured in terms of input delay latency or other metrics that represents how well the user's virtual desktop session is responding. As the system 100 gets busier, the responsiveness decreases and user experiences becomes worse. An auto-scale trigger can be based on user experience decreasing below a certain threshold. When this happens, the auto-scale logic will add new capacity to the host pool by either powering on or creating new VMs. As with other auto-scale triggers, the batch size can be customized. For example, the user defined control may include: (i) a latency threshold for one or more tasks, such as opening a document; and (ii) a number of VMs to add or power on when the latency exceeds one or more of the defined thresholds.

In a fifth example, the user-defined scaling logic may include an auto-scale trigger based on various real-world events. For example, various real-world events can signal that users are ready to start work and sufficient capacity should be made available to accommodate their logins. For instance, there may be a sensor in the parking garage of an office building that measures how full it is and communicates this value to the system 100. Once the system 100 recognizes that the garage is X % full, the auto-scale logic may create additional capacity for a given number of users. Each time X more cars arrive, or the garage is an additional percentage full, the system 100 automatically scales out to create additional capacity while the users are making their way to the office.

In a sixth example, historical information about user logins over a period of time can be used to derive a schedule based on which the host pool should scale out in anticipation of (i.e., not in response to) user demand. During normal work days/hours, the system 100 may scale out in anticipation of user logins. During holidays, the system 100 may not scale out since the system 100 anticipates that no user demand will be coming.

The six examples above are all directed to auto-scaling logic that is applied to a pooled host pool. In some virtual desktop environments, personal desktops are persistently assigned to individual users. In these personal host pool systems, it is not possible to add arbitrary session host VMs and make them available to users when they are needed or remove extra VMs when they are not needed, because each user must use their own desktop VM and cannot user any others. Therefore, a special type of auto-scaling mechanism is needed for personal host pool systems in which it is not possible to create and delete VMs on demand, it is only possible to power on VMs when they are needed. The following two examples: (1) work hours power on/off; and (2) start VM on logon are provided to show how an auto-scaling logic that can be applied in a personal host pool environment.

Figure 7:
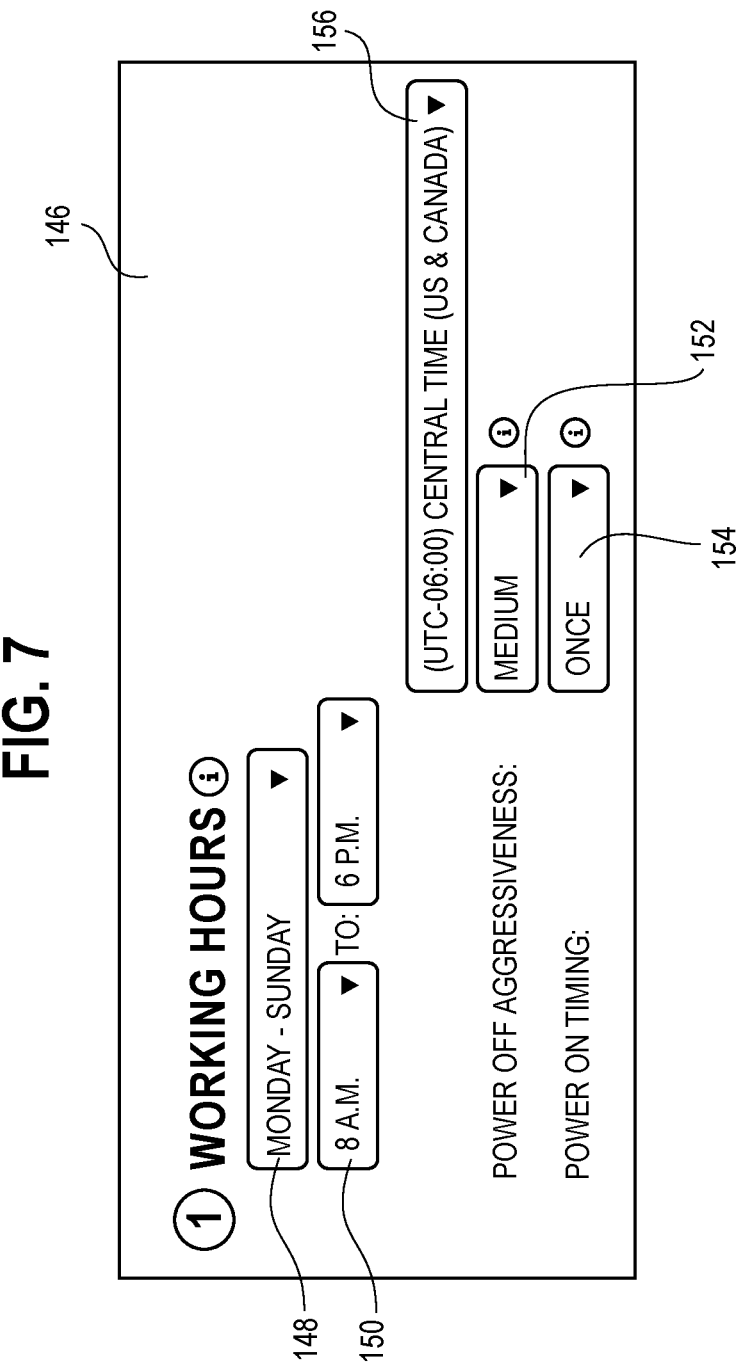
FIG. 7 illustrates a working hours scaling logic tool.

An example of a working hours scaling out logic tool 146 is shown in FIG. 7. The working hours scaling out logic tool 146 shown in FIG. 7 includes a day of the week selection control 148, a time range selection control 150, a "power off aggressiveness" control 152 (e.g., low, medium, and high), and a power on timing control 154 (e.g., once vs. consistent). As further shown, the working hours scaling out logic tool 146 may further include a time zone setting control 156.

In the example shown in FIG. 7, working hours are defined. For example, working hours may be set for Monday through Sunday, 8 AM to 6 PM Central Time (UTC-06:00).

Settings may be provided for "power off aggressiveness" (e.g., low, medium, or high) and "power on timing" (e.g., once or continuous). The power off aggressiveness defines how quickly the system 100 reacts to turn off the VMs in response to non-use or manual power down. When the power on timing is set to once, the VMs are powered on a single time in response to the opening of a working hours window (and therefore can be powered off by user action). When the power on timing user control is set to continuous, the VMs remain powered on during working hours, even if the user or administrator attempts to power on or more of the VMs off manually.

In another example, the auto-scale logic automatically powers on personal desktop session host VMs when a user login is detected. In one example, in response to a user initiated a login request, the request is received by the connection broker service and the logged in database. The auto-scaling logic system then receives a trigger event or proactively polls the connection broker service and logged in database. When the system recognizes a login attempt for a powered off personal desktop VM, the auto-scaling logic causes the appropriate personal desktop session host VM automatically starts.

The examples above describe scale out logic for virtual desktop environments. However, after a host pool is scaled out (whether a pooled host pool or personal host pool), if it is not scaled back in, the system is no better than a non-auto-scaling scenario in which there is more capacity allocated than is needed and costs are needlessly high. Therefore, to provide the objectives and advantages of the systems 100 and methods described herein, the systems 100 and methods include a mechanism to scale in (i.e., reduce capacity) of a host pool when the excess capacity is no longer needed.

When implementing a scale in mechanism, it is important to recognize that virtual desktop sessions are tied to a specific VM. It is currently not possible to dynamically "move" a virtual desktop session from one VM to another without logging the user out of their current session, which requires saving all data and closing all applications. Therefore, it is important to consider all of the implications when scaling in capacity to make it as non-disruptive as possible to the end-users while at the same time optimizing cost savings.

The following paragraphs describe six examples of auto-scaling logic for scaling in a virtual desktop environment in a pooled host pool environment. The six examples demonstrate how the scale in logic may be triggered by: (1) CPU usage; (2) average active sessions; (3) available sessions; (4) event triggers; (5) user experience; and (6) work hour schedules.

An example of a CPU usage scaling logic tool 158 is shown in FIG. 8. The CPU usage scaling logic tool 158 shown in FIG. 8 includes an auto-scale trigger control 160, a CPU usage scale out control 162 through which a user defines a number of host to scale out when the CPU utilization exceeds a given capacity for a given duration, and a CPU usage scale in control 164 through which a user defines a number of hosts to scale in when the CPU utilization drops below a given capacity for a given duration.

In the example shown in FIG. 8, in which auto-scaling logic is applied to a scale in process based on CPU usage, scale in occurs once the CPU usage drops below a pre-configured threshold and stays there for the defined number of minutes. Once this condition is met, a specified batch of VMs is stopped or removed. For example, the logic may be defined such that the system stops or removes (i.e., scales in) up to 1 host(s) when CPU utilization across all hosts drops below 40% for 15 minutes. As shown, the user defined variables in the example shown in FIG. 8 include: (i) a number of hosts to scale out; (ii) a threshold CPU usage over which hosts are to be started or created; (iii) a duration for which the threshold CPU usage must be exceeded before the scale out process occurs; (iv) a number of hosts to scale in; (v) a threshold CPU usage under which hosts are to be stopped or removed; and (vi) a duration for which the threshold CPU usage must be below before the scale in process occurs.

Figure 9:
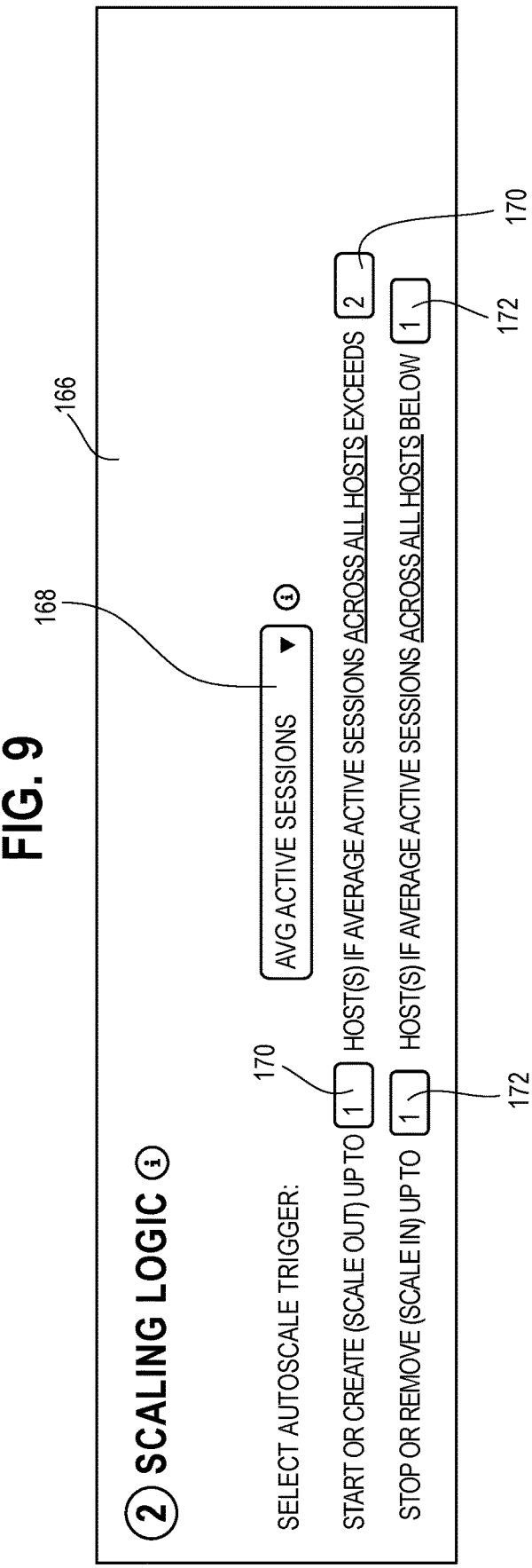
FIG. 9 illustrates an average active sessions scaling logic tool including scale out and scale in definitions.

An example of an average active sessions scaling logic tool 166 is shown in FIG. 9. As shown in FIG. 9, the average active sessions scaling logic tool 166 includes an auto-scale trigger control 168, an average sessions scale out control 170 through which a user defines a number of host to scale out when the average active sessions across all hosts exceeds a given value, and an average sessions scale in control 172 through which a user defines a number of hosts to scale in when the average active sessions across all hosts is below a given value.

In the example of auto-scaling logic applied to a scale in process based on average active sessions shown in FIG. 9, scale in occurs once the average active sessions per host falls below a pre-defined number. At that point, VMs are removed in defined batch sizes. For example, the logic may be defined such that the system stops or removes (i.e., scales in) up to 1 host(s) when the average active sessions across all hosts falls below 1.

As shown, the user defined variables in the example shown in FIG. 9 include: (i) a number of hosts to scale out; (ii) a threshold average active sessions over which hosts are to be started or created; (iii) a number of hosts to scale in; and (iv) a threshold average active sessions under which hosts are to be stopped or removed.

In another example, auto-scaling logic may be applied to a scale in process based on available sessions. In such an example, scale in occurs once the pool of available sessions exceeds the minimum buffer. In response to the pool of available sessions exceeding the minimum buffer, hosts are powered off or removed as long as doing so maintains the minimum buffer after the operation. For example, if the minimum buffer is 5, each host can accommodate 10 sessions, and there are currently 14 available sessions, scaling in 1 host would result in 4 sessions being available (i.e., less than the minimum buffer) and, therefore, the host would not be shut down. In the same scenario, if there were 15 available sessions, then a host would be scaled in to reduce consumption without violating the minimum buffer requirement.

In an example of auto-scaling logic applied to a scale in process based on event triggers, when the number of cars in the monitored parking garage drops below a certain threshold, one or more hosts are scaled in as the parking capacity indicates that users are not in the office.

In an example of auto-scaling logic applied to a scale in process based on user experience, if user experience increases above a certain level (e.g., latency relative to a given task drops below a defined threshold value), VMs are scaled in to remove unneeded capacity.

As with the scale out functions described above, the scale in function may apply to either pooled host pools or personal host pools. For example, in a personal host pool setting, the auto-scale logic may be based on typical office hours. After a specified time (e.g., 6 PM), if the VM is not in use, it may be automatically powered down. The power down function may be applied once or continuously. When the power down timing is set to once, the VMs are powered down a single time in response to the closing of a working hours window (and therefore can be powered on by user action). When the power down timing user control is set to continuous, the VMs remain powered off during non-working hours, even if the user or administrator attempts to power one or more of the VMs on manually.

Each of the examples of scale in logic may be subject to one or more scale in restrictions. Scale in restrictions are used to promote optimized balances of cost savings vs. end-user experience. Scale in restriction settings impose restrictions on the scenarios in which scale in can occur to avoid being overly disruptive to end users. For example, scale in should not occur during lunch hour when the system utilization drops simply because users are temporarily away from their desk. Scaling in at this time would not only cause users sessions to be disconnected, which will close their applications, but will also require a scale out to occur within an hour when users come back to their desks and resume their work. Therefore, it may be valuable to enable a user to set time periods within which scale in can occur and/or time periods in which scale in cannot occur.

In addition, the systems and methods provided herein may be subject to user controls over the scale in aggressiveness. When scaling in, VMs are either shut down or destroyed (depending on base capacity vs. burst capacity settings). Either approach is disruptive to any users currently logged into these VMs. The scale in aggressiveness user settings allow system administrators to balance user disruption with cost savings. For example, in a primary embodiment, there may be three user defined aggressiveness settings: low; medium; and high.

In this example, if the system administrator chooses to set the scale in aggressiveness setting to low, only hosts that have zero active and disconnected sessions will be scaled in. The system 100 continuously monitors the virtual desktop environment for presence of such hosts and scales them in during the allowed time window (i.e., subject to the scale in restrictions described above). This setting results in the least amount of user disruption (e.g., no user disruption), but is not guaranteed to produce any cost savings if users are not disciplined about logging out of their virtual desktops when they are done using them.

In this example, if the system administrator chooses to set the scale in aggressiveness setting to medium, those hosts that have no active session (i.e., those hosts with either no session at all or only disconnected sessions) can be scaled in during the allowed times. This results in disruption to disconnected sessions (i.e., applications are closed), but is more likely to produce compute saving by removing under-utilized VMs.

Figure 10:
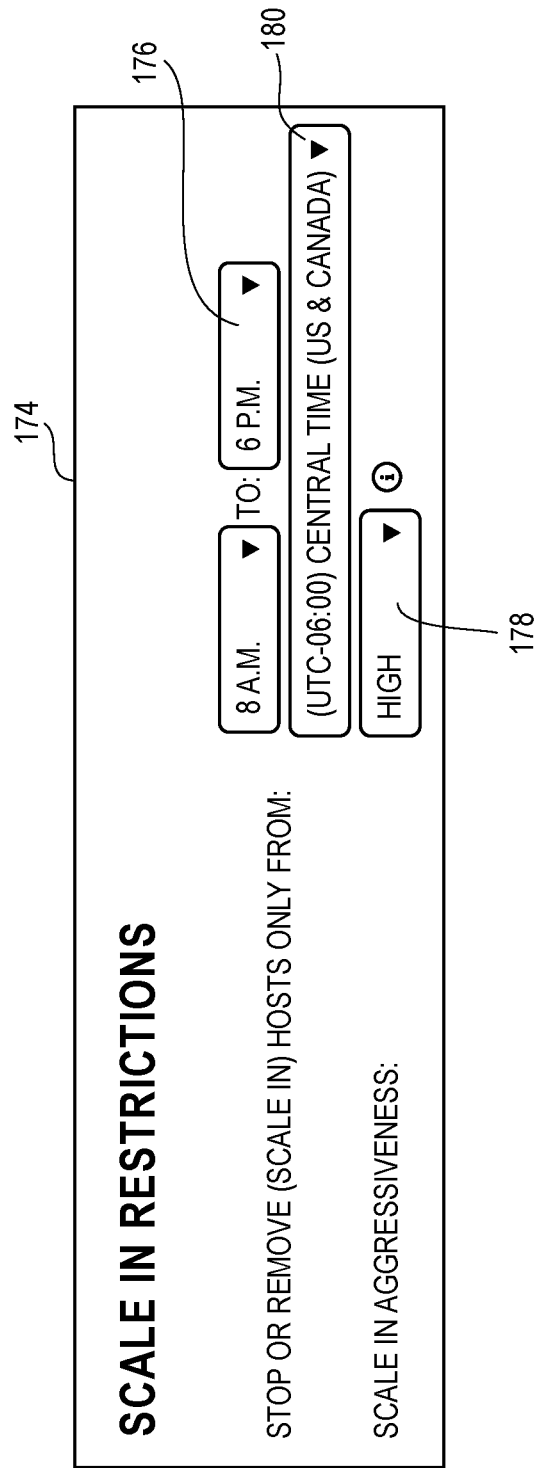
FIG. 10 illustrates a scale in restrictions tool.

FIG. 10 illustrates a scale in restrictions tool 174 including a scale in time control 176 through which a user defines times in which scale in will be restricted and a scale in aggressiveness control 178 through which a user defines a level of scale in aggressiveness to apply (e.g., low, medium, or high). As further shown, the scale in restrictions tool 146 may further include a time zone setting control 180.

In the example shown in FIG. 10, the system administrator has chosen to set the scale in aggressiveness setting to high between 8 AM and 6 PM in the central time zone. Accordingly, during that time, all hosts above the minimum active capacity are scaled in regardless of whether or not they have sessions.

In prioritizing the scale in target VMs, the system 100 may first choose to scale in those hosts with no sessions. Once the first group of hosts are scaled in, the system 100 may then choose to scale in those hosts that have the least number of sessions, set the host to drain mode (i.e., prevent any new connections), send the users a warning message on their virtual desktop screen to give them X minutes to log out and log back in.

Figure 11:
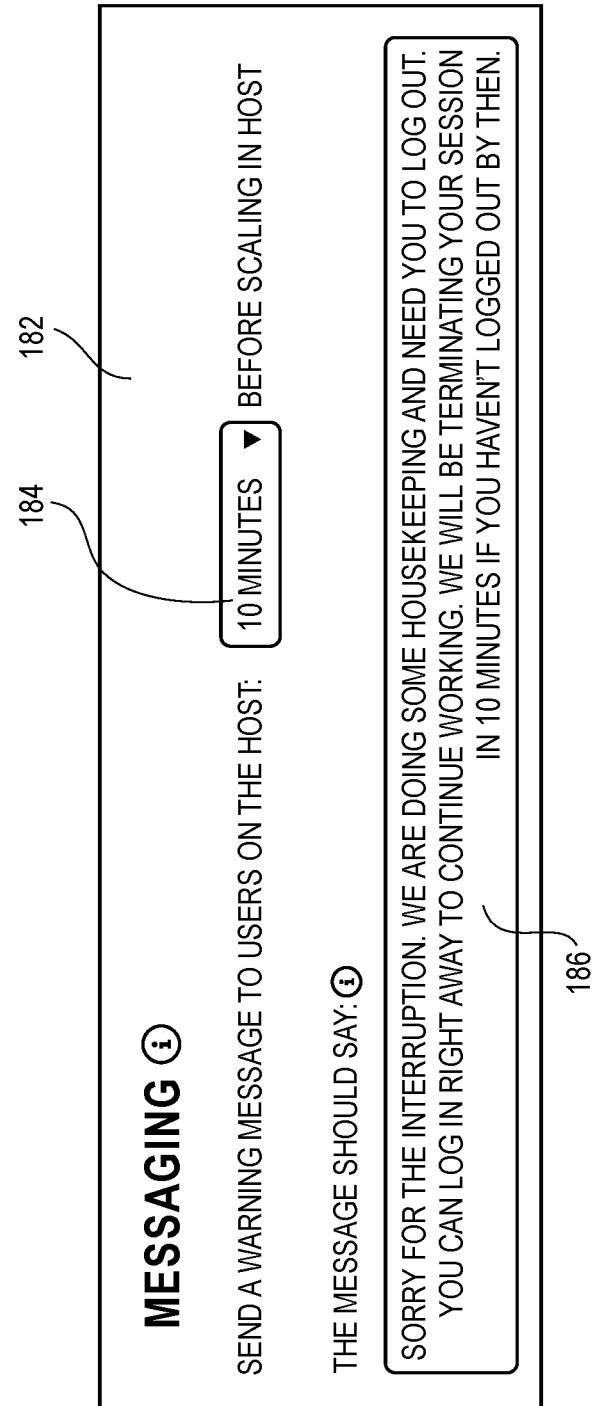
FIG. 11 illustrates a scale in messaging tool.

An example of a scale in messaging tool 182 is shown in FIG. 11. As shown in FIG. 11, the scale in messaging tool 182 includes a warning control 184 through which a user defines a time for when to send a message relative to a scale in action and a warning message control 186 through which a user defines a message to be sent relative to a scale in action. As shown, through the scale in messaging tool 182, the administrator is able to define the number of minutes warning the users are given before scaling the host. The warning message may say something like, "Sorry for the interruption. We are doing some housekeeping and need you to log out. You can log in right away and continue working. We will be terminating your session in 10 minutes if you have not logged out by then." When the users log out and then back in, they are connected to a different host that is not in drain mode. The system 100 continues this process until either the utilization becomes appropriately high or the minimum number of active hosts is reached. In this high setting scale in aggressiveness scenario, scale in savings are very likely because all underutilized capacity will be scaled in when possible.

In some examples of the systems 100 and methods provided herein, the system 100 includes an auto-heal function for session host VMs. In such embodiments, the auto-scaling system is continuously monitoring the status of the session hosts and is aware of any changes from a "healthy" state to a "broken" state in order to take prescriptive actions to repair broken hosts.

In one example, session host status is provided by a WVD agent, which is software installed inside of each session host that facilitates a connection between the end-user and the VM serving the virtual desktop session. The WVD agent has broad visibility of what is happening on the VM and reports the status back to the WVD management service. The normal status is Available. There are several other states that can indicate a problem with the VM, including, for example: Unavailable; FSLogix not healthy; No heartbeat; SxS stack listener not ready; Shutdown; Disconnected; Upgrading; Update failed; Not joined to domain; Domain trust relationship lost; and Needs assistance.

Figure 12:
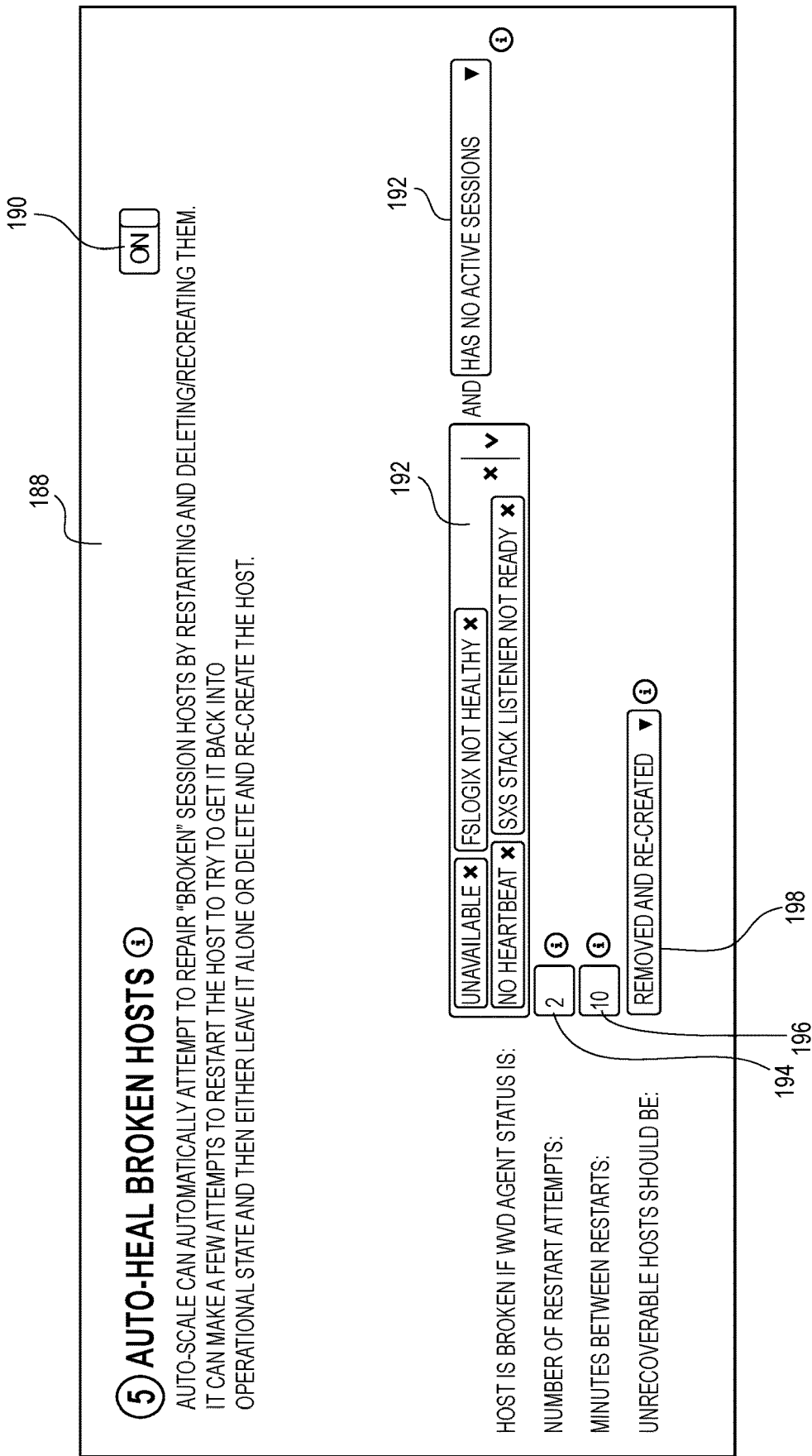
FIG. 12 illustrates an auto-heal broken hosts GUI.

An example of an auto-heal broken hosts GUI is shown in FIG. 12. As shown in FIG. 12, an example of an auto-heal broken hosts tool 188 includes an on/off control 190 for activating and deactivating the auto-heal functionality within the system 100 and a broken session host identification control 192 through which a user defines how to identify when to heal a broken session host, including the applicable WVD agent statuses (e.g., host is broken when WVD agent status is Unavailable, FSLogix not healthy; No heartbeat; SxS stack listener not ready) and whether hosts with "any session" or with "active sessions" should be acted upon. In addition, the auto-heal broken hosts tool 188 includes a number of restart attempts control 194 through which a user defines a number of restart attempts the auto-heal broken hosts tool 188 should attempt, a time between restart attempts control 196 through which a user defines a time (e.g., in minutes) between restart attempts, and a unrecoverable host control 198 through which a user defines how to handle unrecoverable hosts (e.g., remove and re-create).

Accordingly, as shown in FIG. 12, the auto-heal broken hosts tool 188 provides the system administrator with the ability to define what constitutes a broken host (some status may be normal or transient in some environments) and configure an action of what to do when a broken host is detected. The auto-scaling system kicks into action auto-healing broken hosts after it has fully scaled out the environment to avoid dealing with "maintenance" type tasks when more capacity needs to be brought online. Once the scale out process is complete, the auto-scaling system can start healing any broken hosts.

As part of the configuration defining a broken host, the administrator can also specify whether a broken host should be repaired if it has any user sessions on it. It is possible for users to have connected to a host before the host went into broken state. The administrator can configure whether hosts with any session, or with active sessions, should be acted upon or not.

In some examples, the remediation actions can be a combination of: restarting the session hosts one or more times, with delays in between the attempts; deleting and re-creating the session hosts from golden image; and other actions that depend on the broken session host status. For example, the system administrator can define the number of restart attempts, the time (e.g., in minutes) between restart attempts, and how to handle unrecoverable hosts (e.g., remove and re-create).

Various embodiments of the systems 100 and methods provided herein include dynamic, in-line cost estimation to the user (e.g., system administrator) while they are configuring the dynamic host pool auto-scaling. This allows the user to immediately see the impact of the selected configuration choices without having to open a separate spreadsheet or calculator application. The cost estimation tool provides the user with the "boundaries" of the possible costs. That is, the minimum and maximum possible costs across two dimensions of compute and storage, which constitute the 90%+ of the total cost of the typical virtual desktop environment.

For example, the user interface through which the auto-scaling logic is controlled may include a chart providing the estimated monthly costs for the minimum and maximum costs for the compute and for the storage capacity.

The compute cost is the cost of virtual machine compute capacity. This depends on the geographic region, selected VM family, amount of CPU/RAM/storage and other factors. Compute costs are incurred only by VMs that are running. Stopped (i.e., deallocated) VMs exist, but they do not consume compute costs.

The storage cost is the cost of operating system disk storage that is attached to a VM. Factors that contribute to the storage cost include the cost of storage demands on the geographic region where it exists, the type of disk (premium SSD, standard SSD, HDD, etc.), and the size of the storage disk. Costs for storage are incurred regardless if whether the VM that it's attached to is running or stopped. The only time storage costs stop being incurred is when the VM and its associated OS disk is deleted (e.g., removal of burst capacity).

The minimum cost is the cost of compute/storage under the assumptions that the system 100 will stay at its minimum (i.e., scaled in) size and never scale out. The cost of storage depends on: (1) the number of base host pool capacity VMs, since these always exist and the OS disks consume costs; and (2) the cost of storage of any additional VMs that get created during pre-staging that are above the base capacity for the duration between pre-stage time and beginning of scale in restriction time. The cost of compute depends on: (1) the minimum active host capacity as this is the amount of computer that will be running 24/7 at a minimum; and (2) the cost of compute of pre-staged capacity between the hours of beginning of work hours (i.e., pre-stage time) and beginning of scale in restrictions.

The maximum cost is the cost of compute/storage under the assumption that the system 100 will scale out to its maximum size and never scale in. The maximum cost of storage is based on the maximum host pool size. That is the base capacity plus burst capacity running at all times. The maximum cost of compute is similarly based on assuming the system 100 runs at all times.

Some embodiments of the systems 100 and methods taught herein capture actual compute and storage utilization on a minute-by-minute basis. This allows the systems 100 to understand the "actual" costs of an environment, which is what the user would see when they receive their invoice. However, also knowing the configuration of a particular host pool and its auto-scale settings, these systems 100 can understand the minimum possible costs (i.e., if system never scales out), maximum possible costs (i.e., if system scales out and never scales back in), peak costs (i.e., if the host pool is statically sized to accommodate peak demand—somewhere between actual and maximum costs) and, as a result, can derive the savings delivered by the auto-scaling processes.

In some embodiments, costs and savings may be captured graphically at the host pool level and then viewed over any selected period of time. For example, the system 100 may automatically scale out days days per week based on schedule and user demand and scale back in two days per week when it's no longer needed. Savings are reflected as the difference between the peak costs (i.e., what it would cost to run the system statically powered on for the selected duration at its highest usage over the period) and actual costs.

Seeing costs and savings data on a per host pool basis is useful to understand past behavior, but it is useful to see this information on an aggregated basis over a standard period of time (e.g., a month) and over multiple host pools grouped into workspaces. This aggregation over time allows the user to understand the complete costs and auto-scale savings with respect to the entire virtual desktop environment.

Understanding historical costs is helpful, but ultimately decision makers need to understand the projected costs over a standardized period of time (e.g., a month). The systems 100 and methods taught herein enable accurate monthly projections about monthly savings as a result of auto-scaling based on a short sample period of data collection. This data is extrapolated over the standardized period and can be presented in-line at the host pool and workspace level.

With cloud computing costs being "infrastructure size" dependent (e.g., VM size, OS disk type, etc.) and each unit of infrastructure being able to deliver services to a unpredictable number of individual users (i.e., employees), it is difficult to understand the cost of a complex technology like virtual desktops, especially with auto-scaling, on a per user basis. Because the systems 100 and methods described herein provide visibility into utilization by users, possible auto-scale size ranges of the infrastructure, and actual costs incurred by the infrastructure in response to user demand, it is possible to calculate projected, standardized unit costs on a per-user basis.

FIGS. 13-20 show various tools for dynamic, in-line cost estimation.

FIG. 13 illustrates a dynamic cost estimation tool 200 in which the minimum and maximum estimated monthly costs are shown for compute and storage in an estimated monthly costs display 202. The dynamic cost estimation tool 200 shown in FIG. 13 includes an IT environment definition control 204, a host pool sizing control 206, a scaling logic control 208, and a pre-stage hosts control 210, the selections made within each drive the estimated monthly costs display 202.

Figure 14:
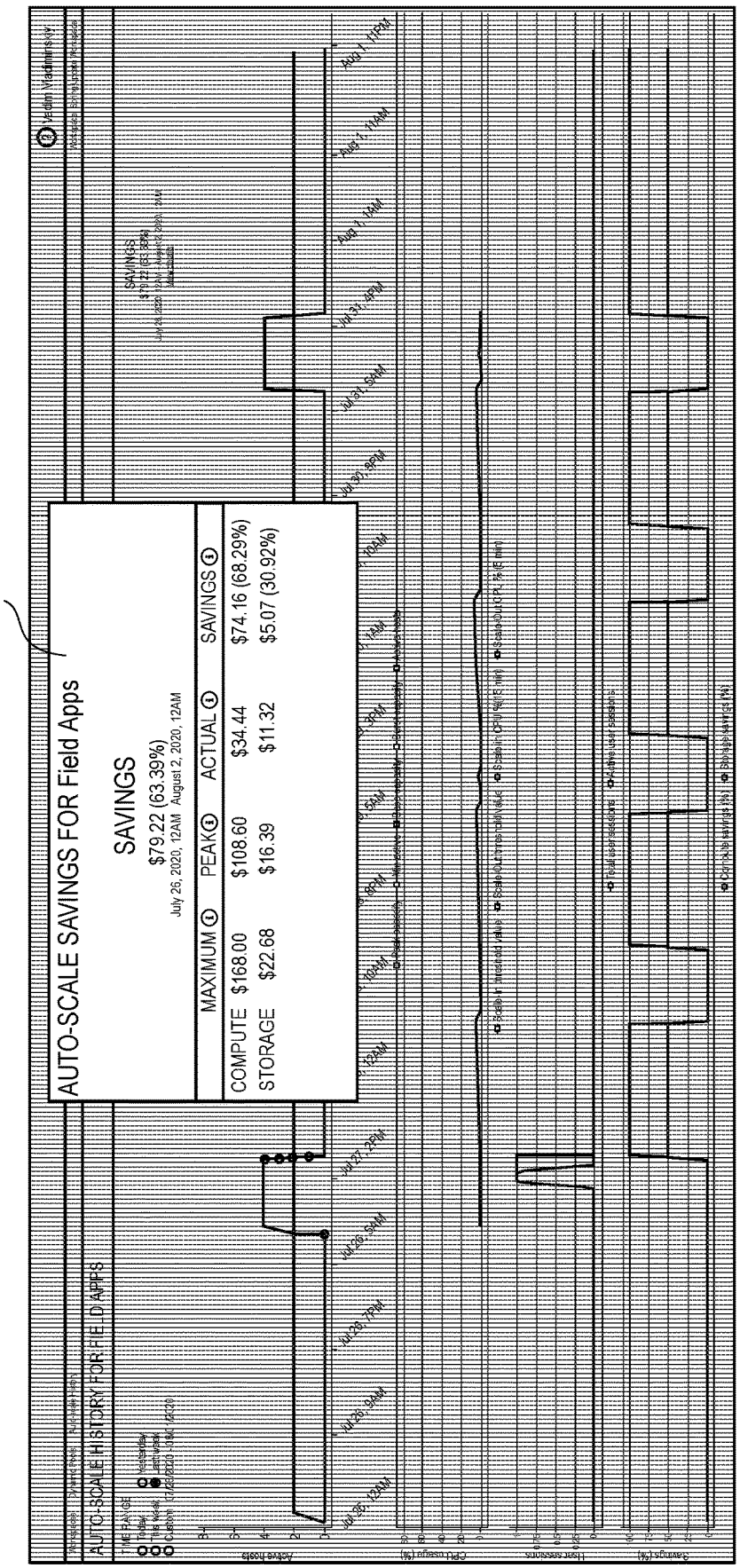
FIG. 14 illustrates a cost tracking GUI.

FIG. 14 illustrates a cost tracking display 212 in which costs and savings are presented graphically at the host pool level and can be viewed over any selected period of time.

FIG. 15 illustrates an aggregated cost and savings display 214 at host pool level over a month. FIG. 16 illustrates an aggregated cost and savings display 216 at workspace level over a month. These tools enable a user to understand the complete costs and auto-scale savings picture over the entire auto-scaling virtual desktop environment.

FIG. 17 illustrates a projected costs at a host pool level display 218. FIG. 18 illustrates a projected costs at a workspace level display 220. These tools enable a user to project the expected costs and auto-scale savings picture over the entire auto-scaling virtual desktop environment.

FIG. 19 illustrates a projected monthly unit cost for per-named and per concurrent user on the host pool level display 222. FIG. 20 illustrates a projected monthly unit cost for per-named and per concurrent user on the workspace level display 224. These tools enable a user to calculate projected, standardized unit costs on a per-user basis.

Aspects of the systems 100 and methods described herein are controlled by one or more controllers. The one or more controllers may be adapted to run the variety of application programs and controls described above with respect to FIGS. 2-20, access and store data, including accessing and storing data in associated databases, and enable the one or more interactions between the user device 102 and the IT environment 104 as described herein. Typically, the controller is implemented by one or more programmable data processing devices, shown, for example, as the user device 102 in FIG. 1. The hardware elements, operating systems, and programming languages of such devices are conventional in nature, and it is presumed that those skilled in the art are adequately familiar therewith.

In the example shown in FIG. 1, the one or more controllers are embodied in a PC-based implementation of a central control processing system utilizing a central processing unit (CPU or processor), memory and an interconnect bus, shown as the user device 102. The CPU may contain a single microprocessor, or it may contain a plurality of microprocessors for configuring the CPU as a multi-processor system. The memory may include a main memory, such as a dynamic random access memory (DRAM) and cache, as well as a read only memory, such as a PROM, EPROM, FLASH-EPROM, or the like. The system may also include any form of volatile or non-volatile memory. In operation, the memory stores at least portions of instructions for execution by the CPU and data for processing in accord with the executed instructions.

The one or more controllers may also include one or more input/output interfaces for communications with one or more processing systems. One or more such interfaces may enable communications via a network, e.g., to enable sending and receiving instructions electronically. The communication links may be wired or wireless.

The one or more controllers may further include appropriate input/output ports for interconnection with one or more output mechanisms (e.g., monitors, printers, touchscreens, motion-sensing input devices, etc.) and one or more input mechanisms (e.g., keyboards, mice, voice, touchscreens, bioelectric devices, magnetic readers, RFID readers, barcode readers, motion-sensing input devices, etc.) serving as one or more user interfaces for the controller. For example, the one or more controllers may include a graphics subsystem to drive the output mechanism. The links of the peripherals to the system may be wired connections or use wireless communications.

Although summarized above as a PC-type implementation, and shown as such in FIG. 1, those skilled in the art will recognize that the one or more controllers also encompasses systems such as host computers, servers, workstations, network terminals, and the like. Further, one or more controllers may be embodied in a device, such as a mobile electronic device, like a smartphone or tablet computer. In fact, the use of the term controller is intended to represent a broad category of components that are well known in the art. As such, it is recognized that the use of the term controller may refer to: (i) a PC-type implementation of a user device 102 communicating with the IT environment 104, as shown in FIG. 1; (ii) may be a mobile device implementation of a user device 102 communicating with the IT environment 104; (iii) may be one or more user-controlled servers or resources within the IT environment 104 itself; or (iv) may be any other user device through which a user implements the processes and controls described with respect to FIGS. 2-20, as will be understood by those skilled in the art based on the teachings provided herein.

Aspects of the systems 100 and methods provided herein encompass hardware and software for controlling the relevant features and functions described with reference to FIGS. 2-20. Software may take the form of code or executable instructions for causing a controller or other programmable equipment to perform the relevant steps, where the code or instructions are carried by or otherwise embodied in a medium readable by the controller or other machine. Instructions or code for implementing such operations may be in the form of computer instruction in any form (e.g., source code, object code, interpreted code, etc.) stored in or carried by any tangible readable medium.

As used herein, terms such as computer or machine "readable medium" refer to any medium that participates in providing instructions to a processor for execution. Such a medium may take many forms. Non-volatile storage media include, for example, optical disks, magnetic disks, and solid-state drives, such as any of the storage devices in the user device 102 shown in FIG. 1. Volatile storage media include dynamic memory, such as the memory of such a computer platform. Common forms of computer-readable media therefore include for example: a floppy disk, a flexible disk, hard disk, magnetic tape, any other magnetic medium, a CD-ROM, DVD, any other optical medium, punch cards paper tape, any other physical medium with patterns of holes, a RAM, a PROM and EPROM, a FLASH-EPROM, any other memory chip or cartridge, or any other medium from which a controller can read programming code and/or data. Many of these forms of computer readable media may be involved in carrying one or more sequences of one or more instructions to a processor for execution.

It should be noted that various changes and modifications to the presently preferred embodiments described herein will be apparent to those skilled in the art. Such changes and modifications may be made without departing from the spirit and scope of the present invention and without diminishing its attendant advantages.

The invention claimed is:

1. A system for dynamically auto-scaling allocated capacity of a virtual desktop environment comprising:
a scalable virtual desktop environment comprising a first set of one or more session host virtual machines providing base capacity resources, including base compute resources and base storage resources, and a second set of one or more session host virtual machines providing burst capacity resources, including burst compute resources and burst storage resources, wherein the base capacity resources are always available to host virtual desktops, wherein the burst capacity resources are temporarily created on demand to host virtual desktops;

a server including a controller controlling an operation of the base capacity resources and the burst capacity resources;

a memory coupled to the controller, wherein the memory is configured to store program instructions executable by the controller;

wherein, in response to executing the program instructions, the controller is configured to:

in response to receiving a log in request from a first user device, connect the first user device to the first host pool to which the first user device is assigned;

execute a load-balancing module to determine a first session host virtual machine to which to connect the first user device from amongst the first set of one or more session host virtual machines and the second set of one or more session host virtual machines; and execute an auto-scaling module comprising a user-selectable auto-scaling trigger and a user-selectable conditional auto-scaling action;

in response to recognition of the conditional auto-scaling action, power on or power off the first set of one or more session host virtual machines providing the one or more base capacity resources and/or create or destroy the second set of one or more session host virtual machines providing the one or more burst capacity resources; and in response to executing the program instructions, the controller is configured to provide an auto-heal broken hosts tool including a set of user tools defining how to identify when to heal a broken session host, the set of user tools including a first tool for receiving a user selection as to which statuses of a software installed inside of the first session host virtual machine that facilitates a connection between the first user device and the first session host virtual machine trigger an auto-heal action, a second tool for receiving a user selection as to whether the auto-heal action applies to the first session host virtual machine when it has any session or only applies when it has one or more active sessions, a third tool for receiving a user selection defining a number of restart attempts, a fourth tool for receiving a user selection defining a time between restart attempts, and a fifth tool for receiving a user selection defining how to handle an unrecoverable host.

2. The system of claim 1, wherein, in response to executing the program instructions, the controller is further configured to: in response to receiving a log in request from a first user device, connect a second user device to a second host pool to which the second user device is assigned.

3. The system of claim 1, wherein, in response to executing the program instructions, the controller is configured to provide a host pool sizing tool including user controls for defining an active host, a base host pool capacity, a minimum active host capacity, and a burst beyond base capacity.

4. The system of claim 1, wherein, in response to executing the program instructions, the controller is configured to provide a pre-stage hosts tool including user controls for defining one or more work days, a start of work hours, and a number of hosts to be active by the start of work hours.

5. The system of claim 1, wherein, in response to executing the program instructions, the controller is configured to provide a CPU usage scaling out logic tool including user controls for an auto-scale trigger selection and a number of host to scale out when the CPU utilization exceeds a given capacity for a given duration.

6. The system of claim 1, wherein, in response to executing the program instructions, the controller is configured to provide an average active sessions per host scaling out logic tool including user controls for an auto-scale trigger selection and a number of host to scale out when the average active sessions per host exceeds a given number.

7. The system of claim 1, wherein, in response to executing the program instructions, the controller is configured to provide an available sessions scaling out logic tool including user controls for an auto-scale trigger selection, a maximum sessions per host, and a minimum number of available sessions that need to be maintained at all times.

8. The system of claim 1, wherein, in response to executing the program instructions, the controller is configured to provide a working hours scaling out logic tool including user controls for a day of the week selection tool, a time range selection tool, a setting for power off aggressiveness, and a setting for power on timing.

9. The system of claim 1, wherein, in response to executing the program instructions, the controller is configured to provide a CPU usage scaling logic tool including user controls for scale out and scale in definitions including an auto-scale trigger selection and a number of host to scale out when the CPU utilization exceeds a given capacity for a given duration, and a number of hosts to scale in when the CPU utilization drops below a given capacity for a given duration.

10. The system of claim 1, wherein, in response to executing the program instructions, the controller is configured to provide an average active sessions scaling logic tool including user controls for scale out and scale in definitions including an auto-scale trigger selection and a number of host to scale out when the average active sessions across all hosts exceeds a given value, and a number of hosts to scale in when an average active sessions across all hosts is below a given value.

11. The system of claim 1, wherein, in response to executing the program instructions, the controller is configured to provide a scale in restrictions tool including user controls for selecting times in which scale in will be restricted and a level of scale in aggressiveness to apply.

12. The system of claim 1, wherein, in response to executing the program instructions, the controller is configured to provide a scale in messaging tool including user controls for when to send a message relative to a scale in action and a control for editing a message to be sent.

* * * * *